United States Patent [19]

Gates

[11] 4,087,509
[45] May 2, 1978

[54] METHOD FOR MANUFACTURE OF WINDOW WITH EXTRUDED SYNTHETIC FRAME AND THE LIKE

[76] Inventor: John I. Gates, 114 Via Mentone, Newport Beach, Calif. 92660

[21] Appl. No.: 471,275

[22] Filed: May 20, 1974

Related U.S. Application Data

[60] Continuation-in-part of Ser. No. 329,661, Feb. 5, 1973, abandoned, which is a division of Ser. No. 145,866, May 21, 1971, abandoned.

[51] Int. Cl.$^2$ .............................................. B29F 5/00
[52] U.S. Cl. .................................... 264/295; 264/313; 264/322; 264/339
[58] Field of Search ............... 264/295, 313, 322, 339, 264/285, 295; 425/384; 72/465

[56] References Cited

U.S. PATENT DOCUMENTS

| | | | |
|---|---|---|---|
| 174,609 | 3/1876 | Wright | 72/465 |
| 1,847,200 | 3/1932 | Vollmerhaus | 72/465 X |
| 1,959,488 | 5/1934 | Meyer | 264/313 |
| 2,571,416 | 10/1951 | Brown | 264/339 X |
| 2,868,264 | 1/1959 | Jones | 72/465 X |
| 2,964,796 | 12/1960 | Press | 264/339 X |
| 3,060,503 | 10/1962 | Eckert | 264/285 |
| 3,184,799 | 5/1965 | Southcott | 425/384 |
| 3,557,277 | 1/1971 | Brodersen | 264/339 X |
| 3,753,635 | 8/1973 | Barnett | 425/384 X |

Primary Examiner—Richard R. Kucia
Attorney, Agent, or Firm—Christie, Parker & Hale

[57] ABSTRACT

Described is a method for bending rigid extruded theromoplastic-resin shapes without significant deformation of the cross-sectional configuration of the shape. The shape is intimately mated between first and second dies cooperatively configured to define the curvature to which the shape is to be bent. The shape, as mated with the dies, is heated by means of a heating fluid sufficiently to cause the thermoplastic material to lose a substantial portion of its tensile strength but insufficiently to cause the thermoplastic material to melt. Heating is continued as the dies are progressively moved into mating engagement with the extrusion over the extent of the shape to be bent. Thereafter, before the dies are moved apart, the bent shape is cooled sufficiently to restore rigidity to the shape.

22 Claims, 24 Drawing Figures

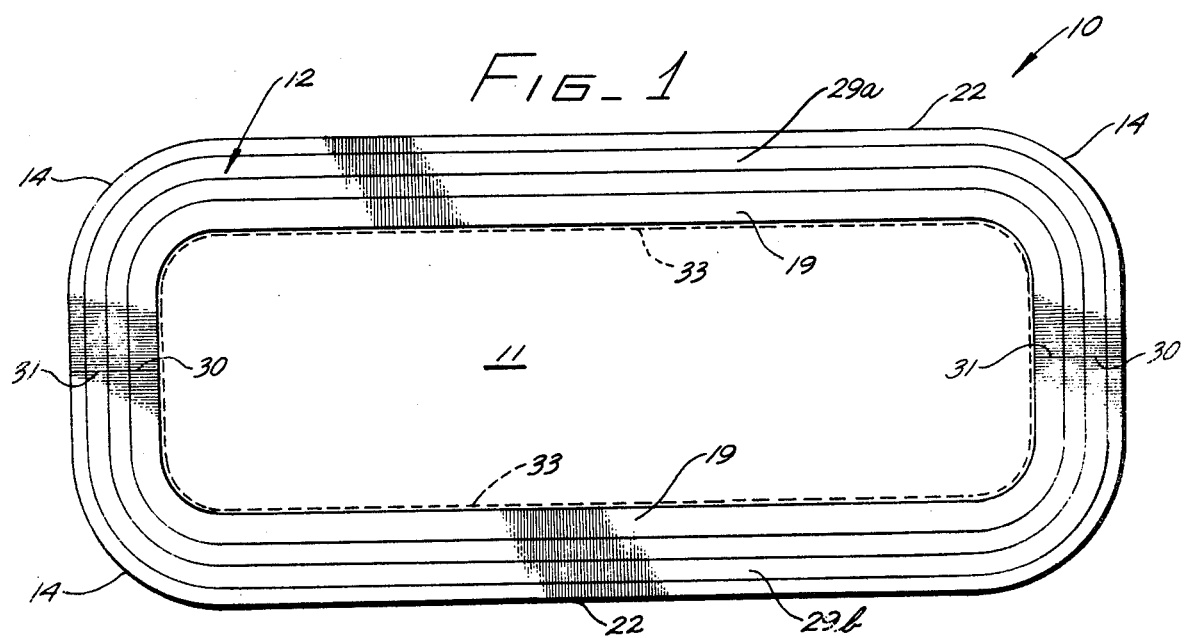
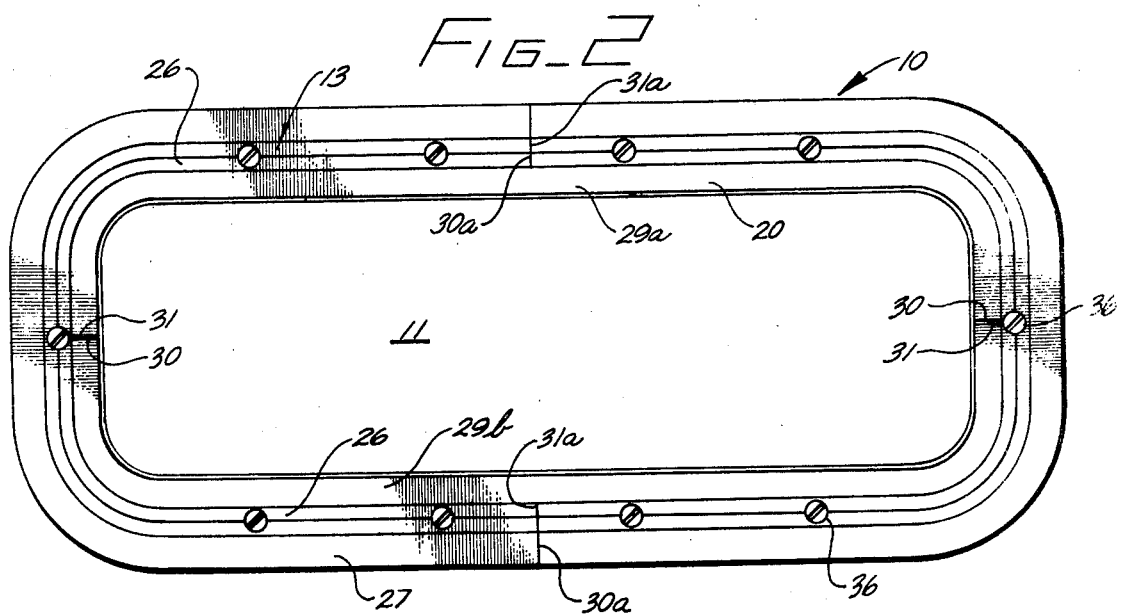

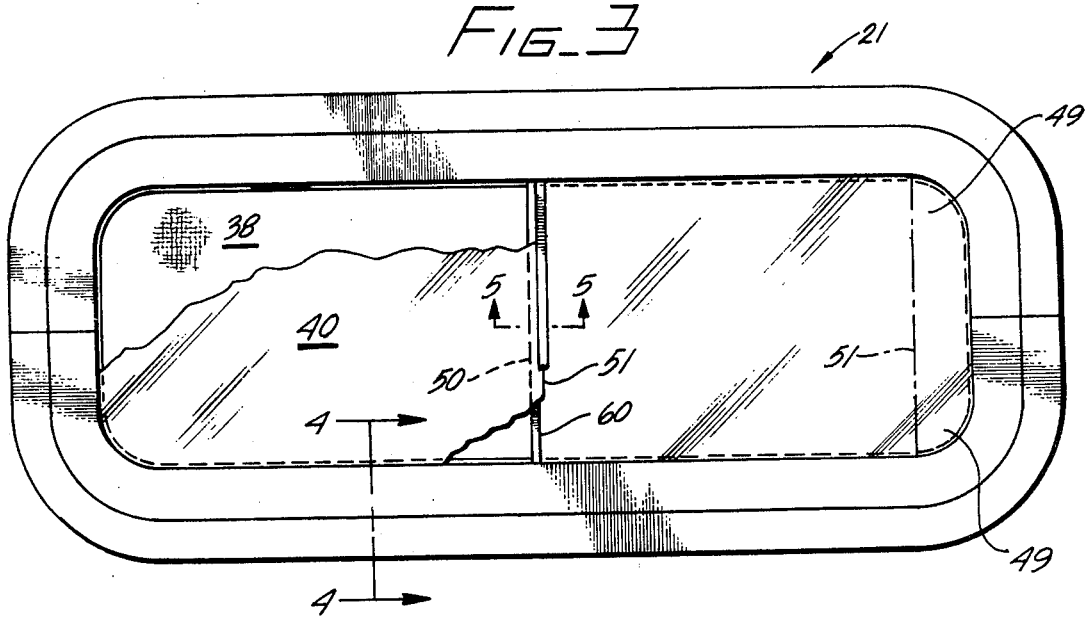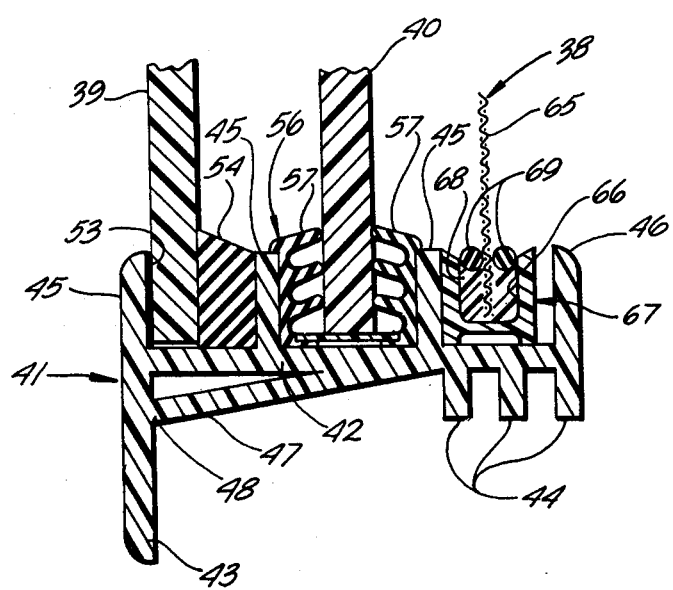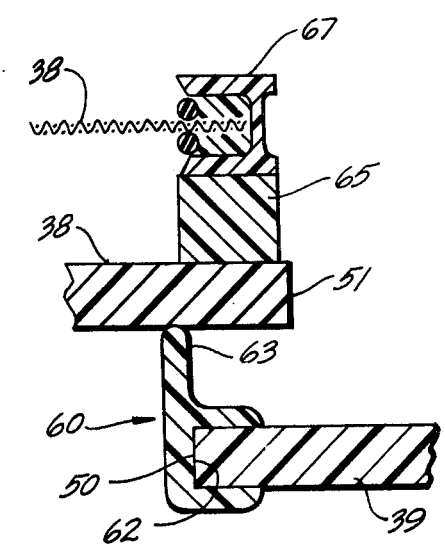

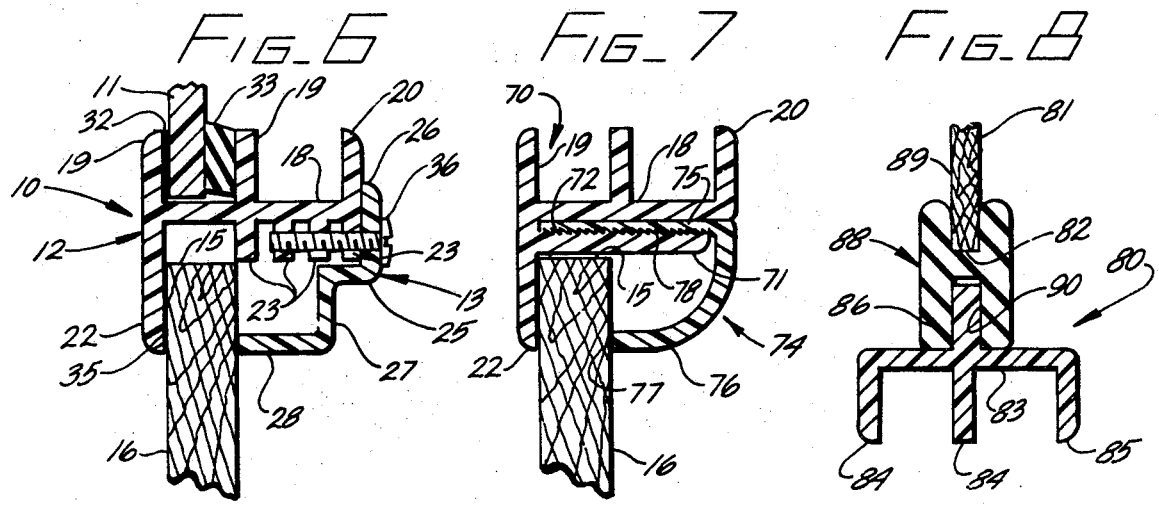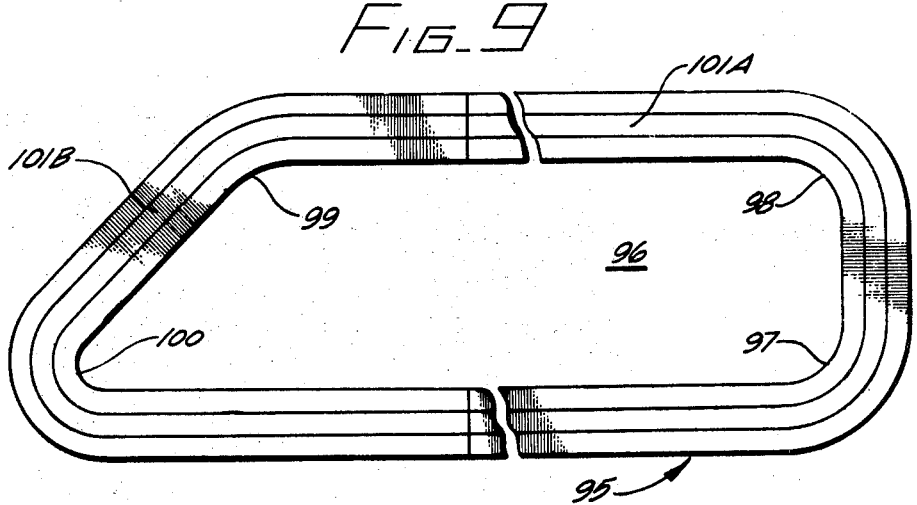

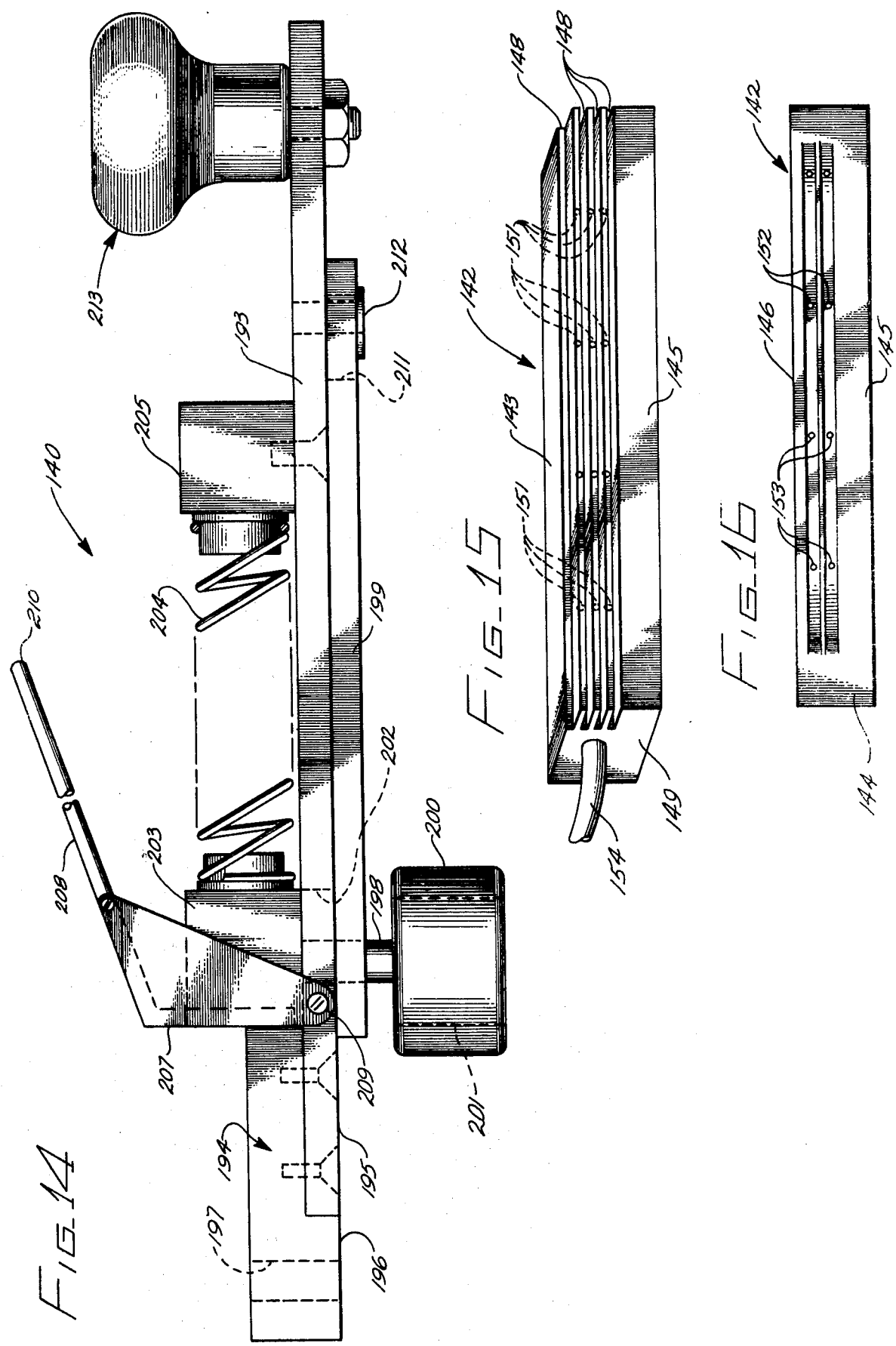

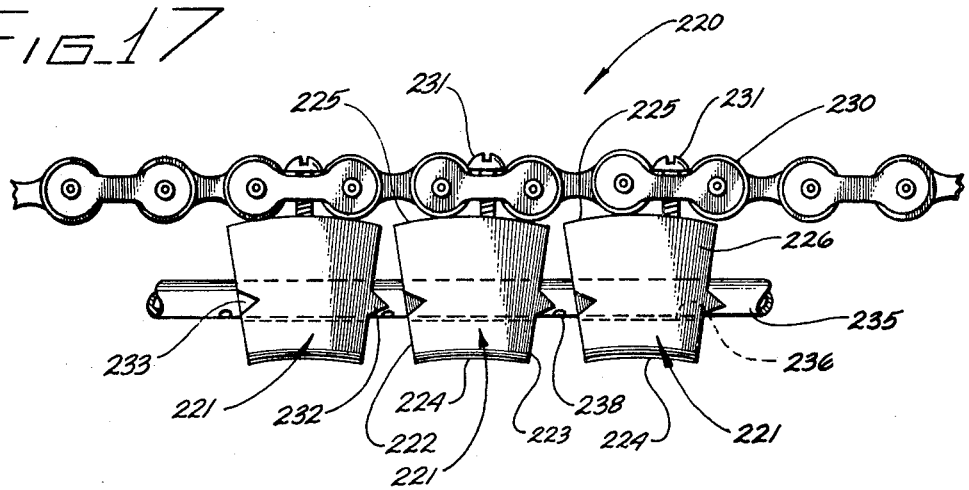
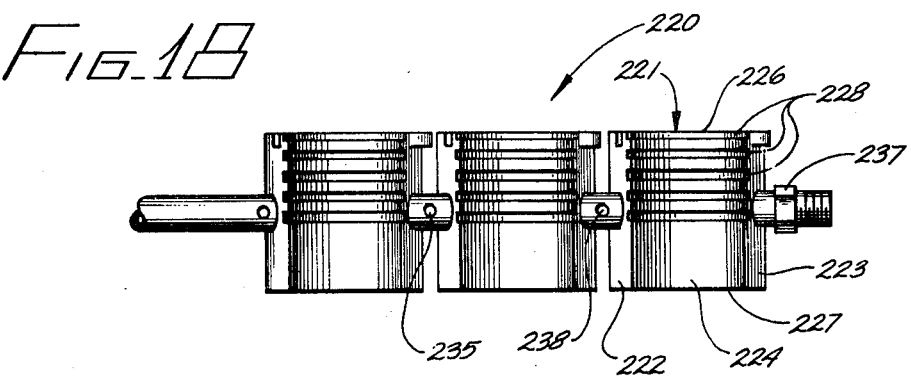
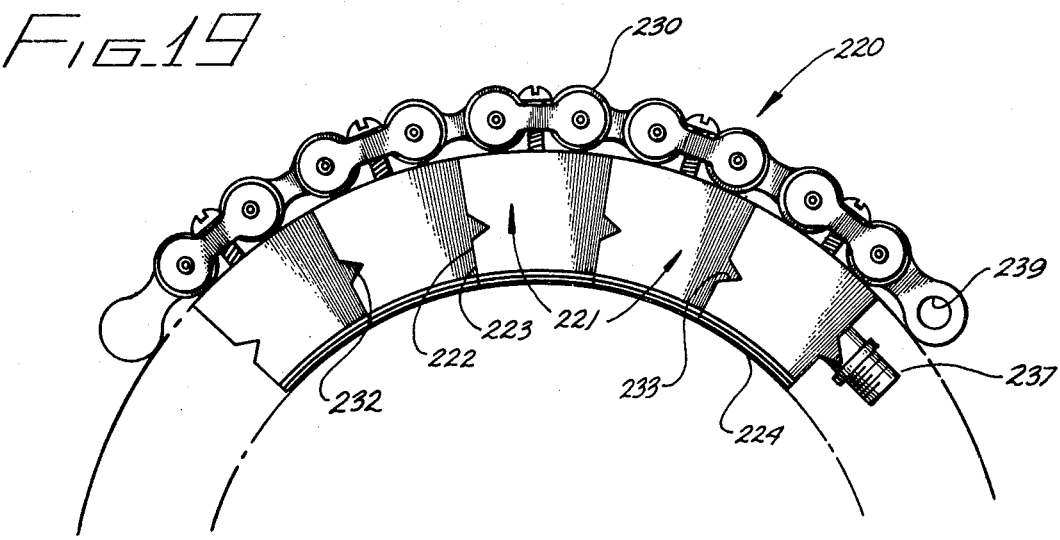

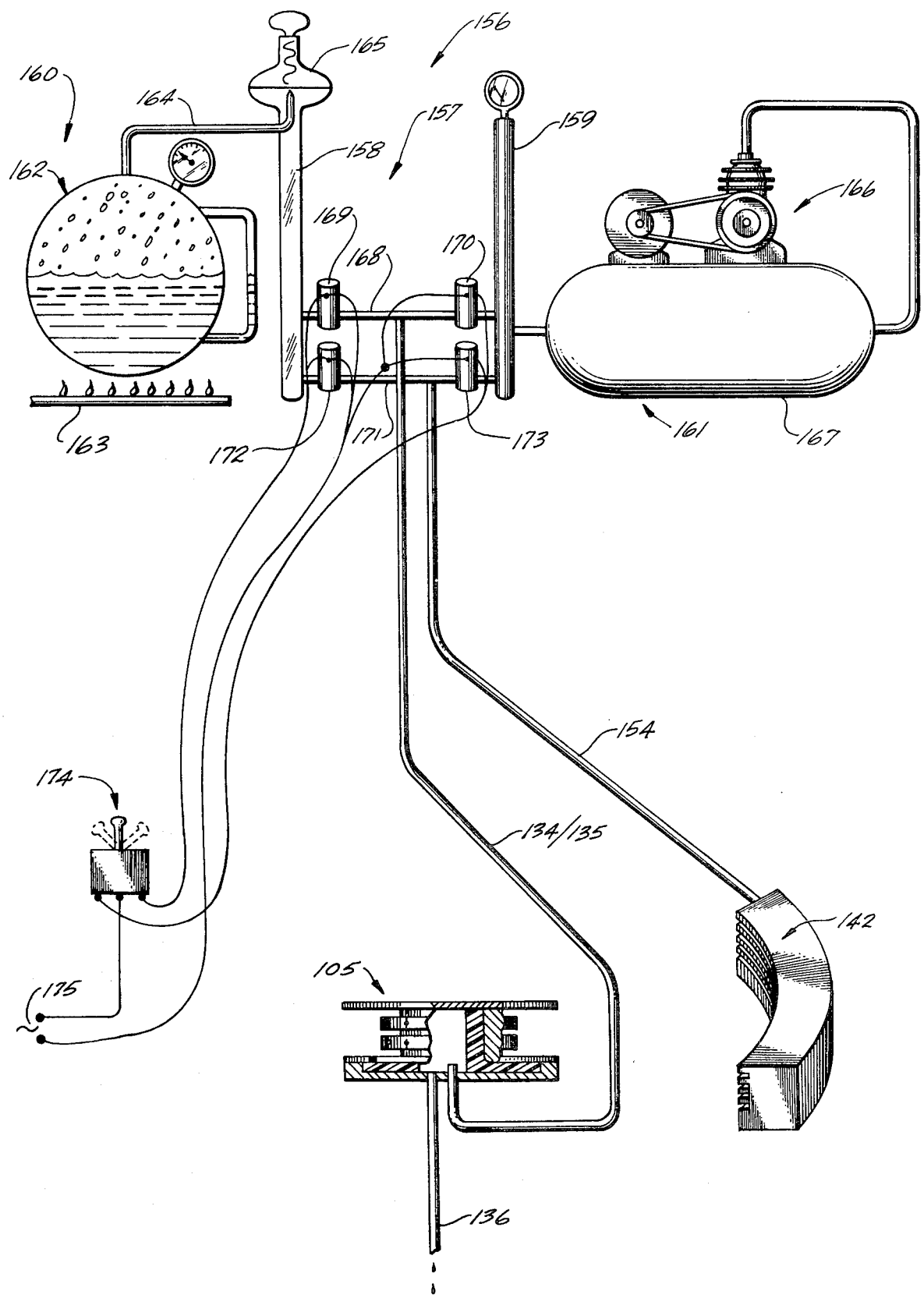

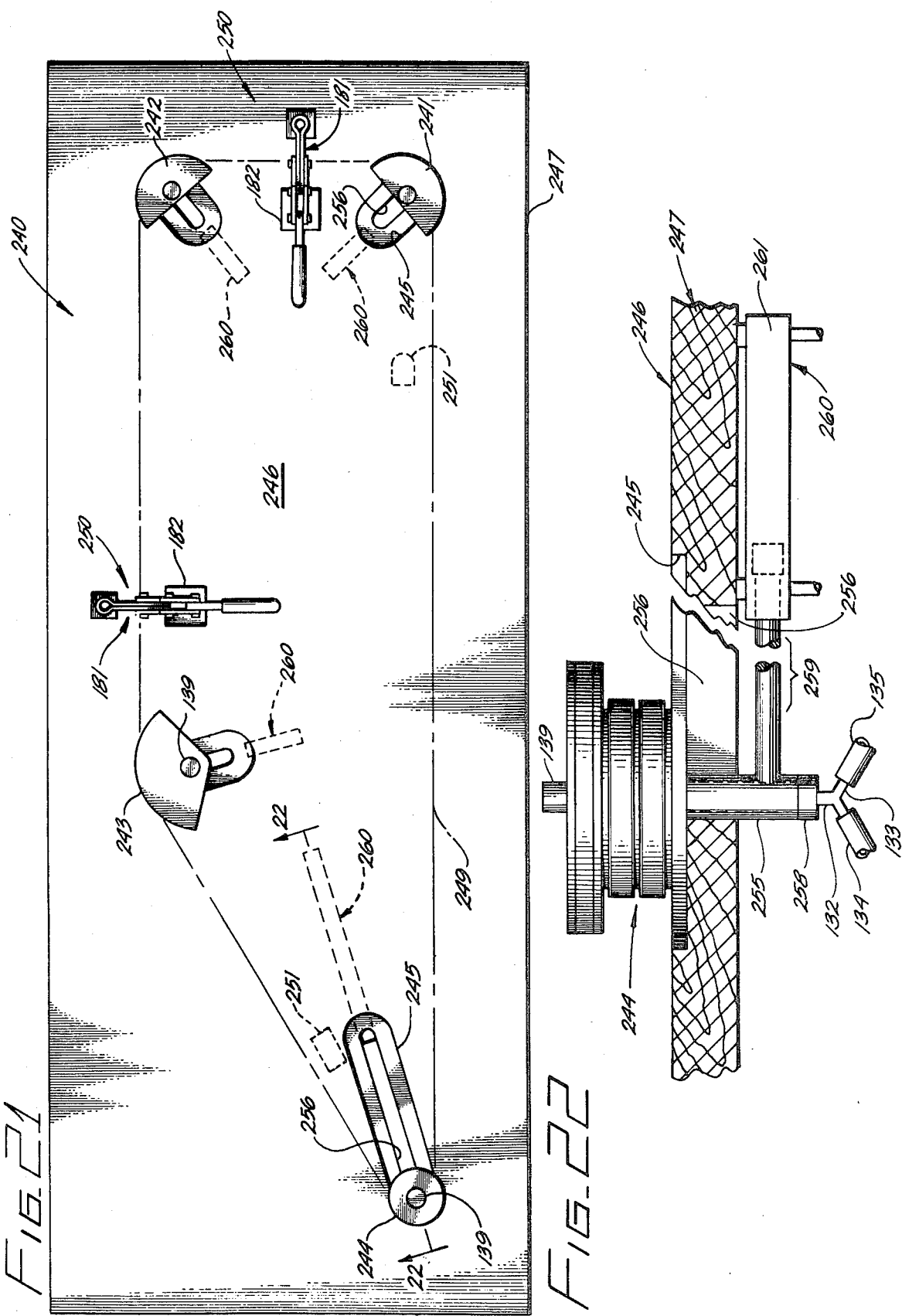

| SW. | DIE #1 (243) | DIE #2 (244) | DIE #3 (241) | DIE #4 (242) | SHOE (142) | CYL. CONT. (260) |
|---|---|---|---|---|---|---|
| 1 | — | — | — | — | — | ACTUATE |
| 2 | H.F. | — | — | — | H.F. | " |
| 3 | C | — | — | — | C | " |
| 4 | C | H.F. | — | — | H.F. | " |
| 5 | C | C | — | — | C | " |
| 6 | — | C | H.F. | — | H.F. | " |
| 7 | — | C | C | — | C | " |
| 8 | — | — | C | H.F | H.F. | " |
| 9 | — | — | C | C | C | " |
| 10 | — | — | — | C | — | " |
| 11 | — | — | — | — | — | DEACTUATE | ived manner and has the appearance of quality construction.

METHOD FOR MANUFACTURE OF WINDOW WITH EXTRUDED SYNTHETIC FRAME AND THE LIKE

CROSS-REFERENCE TO RELATED APPLICATIONS

This is a continuation-in-part of application Ser. No. 329,661 filed Feb. 5, 1973, now abandoned, which application was a division of earlier application Ser. No. 145,866 filed May 21, 1971, now abandoned; prior applications Ser. Nos. 329,661 and 145,866 are now abandoned.

FIELD OF THE INVENTION

This invention pertains to windows for use in boats, camper trailers and the like. More particularly, the invention pertains to an improved window in which the window frame is defined by bent extrusions of rigid thermoplastic material. The invention also pertains to a method for bending an element of substantially rigid synthetic thermoplastic material having a web and at least one flange extending therefrom without significant distortion of the cross-sectional configuration of the element. The invention also pertains to apparatus for performing this bending method.

BACKGROUND OF THE INVENTION

Until very recently windows for use in sailboats, motorboats, yachts, camper trailers, house trailers and the like were fabricated of glass mounted in metal frames. For large boats, such as luxury yachts, the frames are made of brass, stainless steel or other corrosion resistant metal. These frame materials, however, are quite expensive and their use is not justified in the smaller windows required for sailboats, motorboats and camper trailers, for example. In smaller recreational vehicles, such as boats, camper trailers and the like, it is current practice to fabricate the window frames of bent extruded aluminum shapes. Aluminum, however, is susceptible to corrosion, especially in salt atmospheres such as are encountered in marine applications. Corrosion of aluminum window frames may be prevented by painting the frame, but this maintenance effort is not always pursued; also, paint does not adhere readily to aluminum, with the result that where a diligent painting program is pursued the window frames must be repainted frequently.

Recently, in an effort to overcome the disadvantages associated with aluminum frames, a window having a frame fabricated of thermoplastic material has recently been introduced commercially for use in small boats. This product has a pane of transparent synthetic resin and a one-piece frame fabricated of vacuum-formed ABS resin to which the pane is bonded. Because the frame is fabricated by vacuum forming techniques, the thickness of the frame material is necessarily relatively thin. Accordingly, these windows flex readily and the bond between the pane and the frame may break in response to such flexing. These windows have the advantage that they are made entirely of synthetic materials which are resistant to corrosion and which can be colored to harmonize with the remaining structure in which they are installed. These windows, because of their one-piece frame construction, are either bonded or screwed to the basic boat structure peripherally of the window opening. Where provided, an interior trim frame is merely bonded or screwed to the interior of the boat structure for the purposes of ornamentation. The trim frames have no structural cooperation with the support frame for the pane, and are not relied upon to mount the window in the window opening.

Because the pane supporting frames of the aforementioned all-synthetic windows are formed by vacuum forming techniques, the cross-sectional configuration of the frame necessarily must be simple. The complex cross-sectional shapes achievable in extrusions cannot be formed by vacuum forming techniques. Accordingly, existing all-synthetic resin windows are not openable in that the transparent pane of these windows is bonded to the supporting frame entirely around the periphery of the pane. An advantage of the more expensive windows having stamped or extruded frames is that such windows can have a fixed pane, a second movable openable pane and, if desired, a screen; these features are not possible where the frame is fabricated by vacuum forming or similar techniques.

It is known that attempts have been made to provide a window for camper trailers, boats and the like wherein the window frame is defined by an extruded rigid synthetic resin. These attempts sought to realize the increased advantages of a window having an extruded frame; these advantages include the ability to provide openable windows with or without screens and the increased structural strength obtainable with an extruded frame, thereby providing a window frame which does not flex and separate from the pane. These prior attempts were not successful, and it is believed that these failures were caused by the difficulties attendant to bending the normally straight extrusion into the appropriate curvature necessary for these types of windows. Aluminum is readily extrudable into myriad shapes of complex cross-sectional configuration, and these extrusions are bendable from a straight into a curved shape by techniques similar to the techniques used in pipe bending, for example. These techniques are dependent upon the cold-flowability of aluminum under extreme loads. Synthetic resins having the desired characteristics of rigidity and strength, however, do not possess these cold-flowable characteristics, with the result that techniques found successful for the bending of aluminum extrusions cannot be adapted to the bending of extrusions fabricated of synthetic materials such as rigid thermoplastic resins.

It is apparent from the foregoing, therefore, that a need exists for the provision of windows for boats, camper trailers and the like, in which the window frame is fabricated of an extruded synthetic material. Similarly, in order that these products may be produced, a need exists for the development of processes and equipment for the bending of rigid thermoplastic shapes without fracture of the thermoplastic material and without loss of the cross-sectional configuration defined by the shape.

SUMMARY OF THE INVENTION

This invention provides a window for habitable recreational vehicles and the like in which the frame is fabricated of extruded rigid thermplastic material. The frame of this window is not readily flexible in use, and therefore the desired seal between the pane and the window frame is maintained under adverse conditions of use. Because the frame is fabricated of a synthetic resin, the frame is not subject to corrosion and also may be colored to any shade or tint desired. The present window is structurally sound, simple to install in a desired window opening without reliance upon holes drilled into the structure to which the window is to be mounted or without reliance upon gluing of the window frame to the surrounding structure. Also, windows according to this invention can be openable and can be provided with or without screens, as desired.

This invention provides a method for bending an elongate element, such as a frame member for the aforementioned window, fabricated of substantially rigid synthetic thermoplastic material having a web and a flange extending from the web, and it is a feature of this method that the element be bent without significant distortion of the cross-sectional configuration of the element. The method includes the step of intimately mating the element at one end of the extent thereof to be bent between first and second dies. The dies are cooperatively configured to define the curvature to which the element is to be bent and to mate with the cross-sectional configuration of the element. The method also includes the step of heating the mated element with a heating fluid sufficiently to cause the thermoplastic material from which the element is defined to lose a substantial portion but not all of its tensile strength. The heating of the element is continued along the extent of the element to be bent in conjunction with the step of progressively moving the dies into intimately mating engagement with the element over the entire extent of the element to be bent. Then, after the element has been bent to the desired curve and is still intimately mated between the dies, the element is cooled sufficiently to restore the rigid characteristic to the thermoplastic material.

It is preferred that the frame member provided in the aforementioned window be fabricated of rigid vinyl material. It is also preferred that during the bending process, the rigid vinyl extrusion be heated by applying saturated steam directly to the extrusion to cause the rigid vinyl to soften sufficiently to permit bending of the extrusion without tearing of the material during the bending process. Saturated steam has the advantage that its temperature corresponds almost exactly to the optimum temperature to which the rigid vinyl must be raised to permit bending to a curve without tearing of the extrusion. Also, the saturated steam can be provided without complex temperature control equipment, thereby resulting in a bending process and apparatus which are economical.

TERMINOLOGY

In the following description, the term "shape" is often used to refer to a rigid synthetic thermoplastic element which is of complex cross-section, as opposed to flat, so as to have structural properties. The term "shape" is used in the same context as the word "shape" is used to describe rolled steel angles, channels, tees and I-beams for example, as opposed to flat bars, plates, tubes and rods. See, for example, *Hot Rolled Carbon Steel Shapes and Plates,* Second Edition, 1954, United States Steel Corporation, Pittsburgh, Pennsylvania.

It is believed that persons familiar with the structural elements of the character involved in the window described below, and with the manipulation of such elements, will readily recognize the nature of the cross-sectional configuration which renders an element susceptible to satisfactory bending by the present methods as opposed to methods previously known. Such persons will appreciate that the present methods are addressed to elements which, in cross-section, have preferential bending directions and which, in cross-sections, define geometrical features such as flanges or fins which, but for the use of the procedures described, would have their geometry significantly altered in gross or locally during bending of the element to the desired curvature. They will recognize that "shape" as used herein refers to an element which, in cross-section, defines localized features which, unless supported during bending of the element, will deform, distort, or otherwise change geometry or configuration. Thus, the term "shape" as used herein refers to a rigid synthetic thermoplastic element which is so defined that, in order for the element to be bent without significant change in its cross-sectional geometry, a major portion of its cross-sectional configuration must be significantly supported or confined in the portion of the length of the element being or to be bent.

DESCRIPTION OF THE DRAWINGS

The aforementioned and other features of this invention are more fully set forth in the following detailed description presented with reference to the presently preferred embodiments of the product, process and apparatus comprehended by the invention, which description is presented with reference to the accompanying drawings wherein:

FIG. 1 is an elevation view of the exterior side of a window according to this invention;

FIG. 2 is an elevation view of the interior side of the window shown in FIG. 1;

FIG. 3 is an elevation view of the exterior side of an openable multi-pane window according to this invention;

FIG. 4 is an enlarged cross-sectional elevation view taken along line 4—4 in FIG. 3;

FIG. 5 is an enlarged cross-sectional elevation view taken along line 5—5 in FIG. 3;

FIG. 6 is a cross-sectional elevation view of the frame members of another window according to this invention and shows one manner of mounting a window according to this invention in a window opening;

FIG. 7 is a cross-sectional elevation view similar to that of FIG. 6 showing another manner of mounting a window according to this invention in a window opening;

FIG. 8 is a cross-sectional elevation view through the frame member of still another window according to this invention and illustrates a third manner of mounting a window according to this invention in a window opening;

FIG. 9 is an elevation view of the exterior side of a frame member of another window according to this invention;

FIG. 14 is an elevation view of a bending handle useful with the bending dies shown in FIGS. 11 and 12;

FIG. 15 is a perspective view of a flexible bending die according to this invention;

FIG. 16 is a bottom plan view of the bending die shown in FIG. 15;

FIG. 17 is a fragmentary top plan view of another flexible bending die according to this invention;

FIG. 18 is an elevation view of one end of the bending die shown in FIG. 17;

FIG. 19 illustrates a portion of the flexible die of FIG. 11 in its fully closed position;

FIG. 20 is a partially schematic diagram of an extrusion bending apparatus according to this invention;

FIG. 21 is a top plan view of another extrusion bending apparatus according to this invention;

FIG. 22 is an enlarged elevation view taken along lines 22—22 in FIG. 21;

DESCRIPTION OF THE ILLUSTRATED EMBODIMENTS

Figure 10:
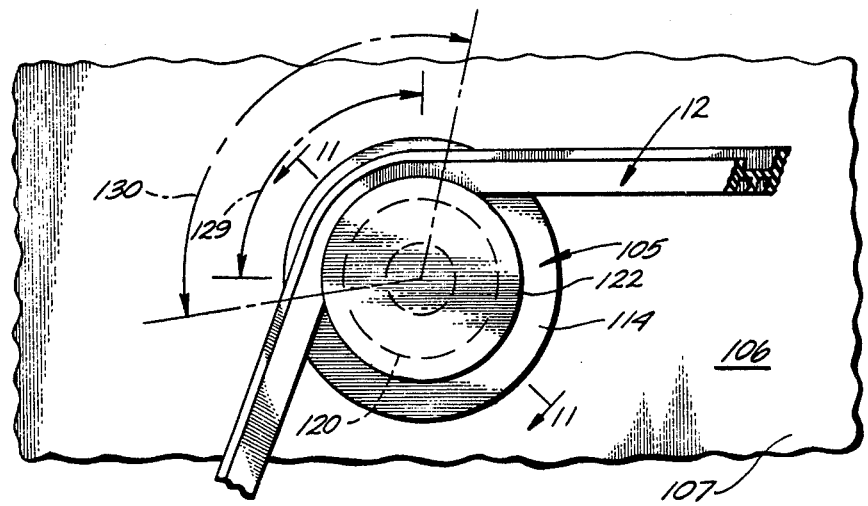
FIG. 10 is a top plan view of a rigid bending die according to this invention.

An exemplary window 10 according to this invention is shown in FIGS. 1, 2 and 6. The window includes a translucent pane 11; as used herein, the term "translucent" means either transparent or partially opaque as in frosted glass. The pane is received within an exterior frame member 12 to which an interior frame member 13 is mated. Window 10 has rounded corners 14 adapting it to be received in a correspondingly configured opening 15 provided through the wall of the hull or deckhouse, for example, of a small boat. Preferably, pane 11 is defined by a piece of acrylic sheet resin the opposite surfaces of which bear an abrasion-resistant fluorocarbon coating; such sheet material is marketed by E. I. DuPont DeNemours & Co., Wilmington, Delaware, under the trademark ABCITE. If desired, however, the pane may be made of clear or tinted glass which may be transparent or partially opaque.

As will be described more fully below, frame members 12 and 13 for window 10 preferably are provided in halves during the manufacturing process, but in the finished window they are essentially integrally connected, as by bonding, to appear functionally and structurally as a single element.

It is preferred that the exterior and interior frame members for a window of this invention be fabricated from bent extrusions of synthetic thermoplastic resin. The presently preferred thermoplastic resin from which the extruded frame members are fabricated is Geon 8700-A polyvinyl chloride resin obtainable from B. F. Goodrich Chemical Company, 3135 Euclid Avenue, Cleveland, Ohio. This resin is referred to as a "rigid" resin because it has a structural strength exceeding 10,000 psi. Geon 8700-A polyvinyl chloride resin has a structural strength of about 11,500 psi and has a heat distortion temperature at 264 psi of 157° F. (see ASTM Standard Test Method D648-56).

As shown in FIG. 6 where members 12 and 13 are shown in transverse cross-section, the exterior frame member 12, as extruded, is a "shape" according to the foregoing definition. Thus, member 12 defines a web 18 which extends across the width of the extrusion. A pair of spaced parallel pane flanges 19 extend from one side of web 18 substantially perpendicular to the plane of the web. A third flange 20 extends from the same side of the web as pane flanges 19 and is spaced from the adjacent one of the pane flanges. Flange 20 preferably has the same extent normal to the web as pane flanges 19. Flange 20 is provided to serve an ornamental function where the completed window is a single-pane fixed-pane unopenable window, such as window 10; flange 20 also serves as a pane flange for a movable window pane in the case where the window is a multi-pane openable window such as window 21, shown in FIG. 3. The cross-sectional configuration of exterior frame member 12 also includes a mounting flange 22 which extends from the opposite side of the web, preferably at one edge of the web so as to be aligned with one of pane flanges 19; flange 20 preferably is aligned with the opposite edge of web 18. A plurality of stub flanges 23 extend from the same side of the web as mounting flange 22 and are spaced at regular intervals apart from each other over approximately one-half the width of the web. One of the stub flanges preferably is aligned with flange 20 and the remaining stub flanges are spaced so that the stub flange closest to mounting flange 22 is aligned with the pane flange 19 which is disposed intermediate the width of the web.

Also as shown in FIG. 6, the extruded shape for frame member 13 includes a web 25 and a flange 26 disposed perpendicular to the web along one edge of the web. An angle section is included in the cross-sectional configuration of the inner frame member and is associated with the opposite edge of web 25. Accordingly, an angle section leg portion 27 extends normal to web 25 along the edge of the web opposite to the edge with which flange 26 is associated. An angle section flange portion 28 extends from the end of leg portion 27 remote from web 25 and extends from the leg portion in a direction away from flange 26. Therefore, flange 26 and leg portion 27 are disposed parallel to each other and extend in opposite directions from opposite edges of web 25. Web 25 and flange 28 of the angle section of the cross-sectional configuration of interior frame member 13 are disposed parallel to each other and extend in opposite directions from opposite edges of leg portion 27. Thus, in transverse cross-section, interior frame member 13 has a generally "W" shaped configuration.

Exterior and interior frame members 12 and 13 preferably are provided as straight extruded shapes which are bent during manufacture of window 10 to a curvature appropriate to the radius of curvature appearing at the rounded corners of window opening 15. During the bending process, exterior frame member 12 is bent so that pane flanges 19 and flange 20 extend from the side of the web which is bent to assume a concave curvature. Similarly, the interior frame member extrusion is bent so that flange 26 extends from that side of flange 25 which is bent to assume a concave curvature. A preferred extrusion bending process and the preferred apparatus used therein are described in detail below following the description of the structures shown in FIGS. 1-9.

As shown in FIG. 1, frame member 12 preferably is defined by two pieces 29A and 29B each of which has opposite ends 30 and 31. The exterior frame member also is provided in two pieces. To facilitate assembly of the window, the exterior frame member extrusion preferably is bent as one piece and is thereafter cut in half, thereby to define pieces 29A and 29B. On the other hand, pieces 29A and 29B may be bent separately from appropriate lengths of exterior frame member extruded stock material. To assemble the window, the pane, which has been pre-cut with rounded corners, is inserted between the pane flanges of exterior frame member piece 29A and 29B, for example, and the pieces are butted together. The frame pieces are then bonded together. Once pieces 29A and 29B have been connected, the pane is bonded, as at 32, to the frame, preferably to the pane flange which is aligned with mounting flange 22. This bonding preferably is accomplished by a solvent bonding process using a solvent effective upon both the synthetic material from which the exterior frame member extrusion is made and the synthetic material from which the pane is fabricated. In those cases where the pane is defined by ABCITE abrasion-resistant acrylic sheet material, it may be necessary to condition the pane around its edges by removing the fluorocarbon abrasion-resistant coating which characterizes this particular pane material. Tetrahydrofurane, especially when applied by a syringe, has been found to be a suitable solvent where acrylic and vinyl resins are to be bonded. Alternatively, conventional PVC glue may be used, if desired. In this manner, ends 30 and 31 of piece 29A are securely connected to the corresponding ends of piece 29B so that, once the pieces have been connected to each other around a pane, the exterior frame member is effectively homogeneous around the entire periphery of the pane. Because of the cross-sectional configuration of the exterior frame member, it is apparent that this frame member does not readily flex, with the result that, in use, the bond between the exterior frame member and the pane is maintained.

As is apparent from FIG. 6, it is preferred that the spacing between the adjacent faces of pane flanges 19 be somewhat greater than the thickness of pane 11. Therefore, when the pane has been secured to the exterior frame member, a space exists peripherally of the pane between the pane and the adjacent surface of pane flange 19 to which the pane is not bonded. This space is filled with a suitable glazing material such as a silicon rubber. If desired, a strip of extruded flexible vinyl glazing strip may be forced between the inner surface of the pane and the adjacent pane flange. In this manner, a structurally sound and thoroughly weather-tight connection is made between pane 11 and the exterior frame member around the entire periphery of pane 11 to provide a single-pane, fixed-pane permanently closed window assembly 10.

Where a glass pane is used in a window according to this invention, it is preferred that the periphery of the pane carry a coating of some resin, such as vinyl butyrate, which adapts the glass for connection to the window frame by solvent bonding processes. For example, a ribbon of vinyl butyrate may be adhered to the periphery of a glass pane by applying heat and pressure via a tetrafluoroethylene pressure pad which withstands applied heat but does not stick to the vinyl butyrate. Tetrahydrofurane is a suitable solvent for bonding vinyl butyrate to polyvinyl chloride, for example.

The interior frame member extrusion is bent to mate closely with the exterior frame member in the completed window. As shown in FIG. 6, during bending of the interior frame member the extrusion thereof is bent to a curvature selected so that there is a clearance provided between the ends of stub flanges 23 of the exterior frame member and the face of interior frame member web 25 from which flange 26 extends. In completed window 10, the linear dimension from the face of flange 26 which opens toward web 25 to the unsupported end of flange 28 is selected with respect to the thickness of the wall or other structure in which window opening 15 is defined.

The curvature to which exterior frame member 12 is bent in manufacture of window 10 is selected so that, in the completed window assembly, stub flanges 23 may be passed through window opening 15, as shown in FIG. 6. It is preferred that before the exterior frame member is inserted into window opening 15, a bead of suitable caulking material 35 is applied to the exterior surface of wall 16 immediately adjacent window opening 15. The exterior frame member, with the pane mounted therein, is then inserted into the window opening from the exterior of the structure until the mounting flange of the exterior frame member abuts the wall structure in overlying relation to the bead of caulking material. The interior frame member is then mated to the exterior frame member from the inside of wall 16 and is secured to the exterior frame member by means of screws 36. As shown in FIG. 2, the screws are provided at spaced locations around the periphery of the window and are passed through flange 26 of the interior frame member and through at least some of stub flanges 23 of the exterior frame member. Stub flanges 23 are provided so that screws 36 may be used effectively to connect the frame members and tightly clamp the wall 16 between mounting flange 22 and the end of flange 28, as shown in FIG. 6.

Where the above-described exterior frame member extrusion is used in the manufacture of a single-pane window, the channel defined in the exterior frame member by flange 20 adjacent pane flange 19 and web 18 serves no function. The portion of web 18 lying between flange 20 and the adjacent pane flange 19, and the stub flanges, are used to facilitate clamping cooperation between the exterior and interior frame members for mounting window 10 in window opening 15.

FIG. 3 is an elevation view of the exterior side of an openable multi-pane window 21 equipped with a screen 38. Window 21 is described with reference to FIG. 4, but as will be shown, a multi-pane openable window can be provided without a screen using the same extrusions as already described concerning window 10. Window 21 includes a fixed pane 39, a movable pane 40, and screen 38, all of which are mounted in an exterior frame member 41 which is shown in transverse cross-section in FIG. 4.

The extrusion for frame member 41 is similar to the extrusion for frame member 12 in that it includes a web 42 which defines the width of the frame member, a mounting flange 43, and stub flanges 44. Mounting flange 43 and stub flanges 44 extend from the same side of web 42 in association with opposite edges of the web. Thus, elements 42, 43 and 44 of frame member 41 are seen to correspond closely to elements 18, 22 and 23, respectively, of frame member 12. The extrusion for frame member 41 also defines three spaced pane flanges 45 and an additional flange 46; these elements correspond to elements 19 and 20 of frame member 12 except that in frame member 41 three pane flanges 45 are present. As in frame member 12, pane flanges 45 and flange 46 are of equal extent away from web 42 and are regularly spaced to extend perpendicular to the web from the side thereof opposite to the side from which flanges 43 and 44 extend. One of pane flanges 45 is coplanar with one of stub flanges 44, and flange 46 is coplanar with mounting flange 43. Also, frame member 41 includes a stiffening element 47 which interconnects mounting flange 43 and web 42 intermediate the width of the web. The point of connection of the stiffening element to mounting flange 43, as at 48, preferably is no farther from the adjacent side of web 42 than the free ends of stub flanges 44. Thus, as in the case of frame member 12, the size of the window opening into which frame member 41 is fitted is determined with reference to stub flanges 44. Stub flanges 44 serve the same function in frame member 41 as do stub flanges 23 in frame member 12.

Fixed pane 39 bears a somewhat different relation to the "sight" opening of window 21 than does pane 11 to the sight opening of window 10. That is, in window 10, pane 11 completely fills the sight opening of the window. (The "sight" opening is the clear viewing area of the window in its completed form.) In window 21, however, pane 39 fills only about one-half the sight area of the window. Thus, pane 39 has two rounded corners 49 and a straight edge 50 which, in the completed window, is disposed vertically at about the middle of the window. Movable pane 40 has rounded corners adapted to mate intimately with the exterior frame member of window 21 when the movable pane is in its closed position relative to the fixed pane as shown in solid lines in FIG. 3. Movable pane 40, however, has a length along the width of the window which is slightly greater than the length of the sight area of the window not filled by pane 39. Accordingly, movable pane 40 has an edge 51 which, when the movable pane is disposed in its closed position relative to the fixed pane, is disposed adjacent fixed pane edge 50 but between such edge and the opposite end of the fixed pane. The movable pane is slidable within exterior frame member 41 between the closed position shown in solid lines in FIG. 3 and an opened position shown in broken lines in FIG. 3. The opened position of the movable pane is limited by the point at which the movable pane begins to interfere with the exterior frame member adjacent the rounded corners 49 of the fixed pane.

As shown in FIG. 4, fixed pane 39 is mounted according to the above-described techniques and methods between those two pane frames 45 which lie closest to and adjacent mounting flange 43. Preferably the fixed pane is bonded, as at 53, to the pane flange which lies outwardly of the width of the web. Glazing material 54, such as silicon rubber or an extruded flexible glazing strip is provided between the pane and the pane flange closest to the inside edge of web 42 in the completed window.

Movable pane 40 is mounted between the pane flanges disposed most centrally of the width of web 42. The mounting of the movable pane to the exterior frame member is by means of a flexible glazing insert molding 56 which is fabricated of resilient material such as a flexible vinyl resin, neoprene rubber or some other suitable weather-resistant elastomer. It is also conventional to use a rubber insert molding which has been flocked to provide a low coefficient of friction relative to the movable pane. The glazing molding 56 defines a plurality of resilient fingers 57 which bear against opposite faces of the movable pane and effectively provide a seal between the exterior frame member and the movable pane. The glazing molding is mounted in the exterior frame member so that, when the movable pane is in its closed position, it engages the rounded end of the movable pane and the adjacent elongated side edges of the movable pane; the glazing molding also extends sufficiently along the inner frame member toward the rounded end of fixed pane 39 that, during motion of the movable pane throughout the entire range of movement afforded to it within the window, the elongate side edges of the movable pane cooperate with the flexible glazing. As shown in FIG. 4, movement of the movable pane within the flexible glazing is facilitated by incorporating a strip of self-lubricating bearing material 58 within the flexible glazing adjacent frame member web 42 for cooperation with the adjacent elongate side edge of the movable pane. The self-lubricating bearing material may be fabricated of tetrafluoroethylene, polyethylene or polypropylene, for example. On the other hand, a flocked rubber insert molding may be used if desired.

From the foregoing description, it is apparent that in window 21 the opposing faces of the fixed and movable panes of the window are spaced from each other by a distance which is essentially equal to the thickness of (1) one of pane flanges 45, (2) a distance equal to the distance by which the movable pane is supported from the adjacent pane flanges by flexible glazing molding 56, and (3) the distance between the fixed pane and the central pane flange. This space is effectively sealed between the movable and fixed panes along edge 50 of the fixed pane by a seal element 60, shown in FIG. 5. The seal element preferably is fabricated of a flexible elastomeric material such as flexible vinyl, neoprene rubber or the like, and is carried by the fixed pane along straight end edge 50 thereof. The fixed pane is received in a groove 62 formed in the seal element. The seal element also defines a flexible resilient lip 63 along its length, the end of which movably bears against the adjacent face of fixed pane 39.

A screen assembly 38 is also mounted within exterior frame member 41 and extends across approximately the same fraction of the sight area of window 21 as does movable pane 39. The screen assembly includes a piece of woven wire mesh 65 having its periphery supported in a channel 66 defined in a frame element 67 which extends circumferentially of the mesh. The mesh is held in the frame element by filling the channel with a flexible glazing material 68, such as silicon rubber, which imbeds the mesh and bonds to both the mesh and the walls of the channel. Preferably a rubber grommet (or a bead strip) 69 is disposed between each wall of the channel and the adjacent face of the mesh and is bonded in place by the flexible glazing for the screen assembly. Frame element 67 for the screen assembly preferably is fabricated of a substantially rigid synthetic resin and preferably is merely positioned but not fixed in the channel between flange 46 and the adjacent one of pane flanges 45 of exterior frame member 41. The screen is slidable in the channel provided in frame member 41 between flange 46 and the adjacent pane flange in the same manner and over the same distance as the movable pane is slidable in the frame. As shown in FIG. 5, the portion of frame element 67 which lies adjacent edge 50 of the fixed pane when the screen is in its closed position is effectively sealed to the adjacent surface of the movable pane by a seal strip 64. The seal strip is carried by element 67 and preferably is a strip of polyurethane foam material which is lightly compressed between element 67 and the movable pane.

In accordance with the foregoing description concerning window 10, it is preferred that exterior frame member 41 be provided in two pieces which are bonded together to form an essentially unitary member after the fixed pane, the movable pane, and the screen assembly have been inserted into their respective channels.

Preferably, solvent bonding of the fixed pane to one of the two pieces of the exterior frame member, and of the other piece of the exterior frame member to the fixed pane and to the other half of the exterior frame member, is facilitated by using a hypodermic syringe, or the like. A suitable solvent, such as tetrahydrofurane, is placed in the syringe. The needle of the syringe is put into or adjacent to the space at which solvent welding is to be produced. The solvent is then injected into this space as the needle is drawn through or along the space.

A complete window 21 of the type shown in FIGS. 3 and 4 also includes an interior frame member (not shown) which is similar to interior frame member 13 of window 10 except that angle section flange portion of the interior frame member for window 21 is longer than the corresponding feature of interior frame member 13 by an amount equal to the difference between the web widths of frame members 41 and 12, assuming that window 21 is to be installed in the same thickness wall as is illustrated in FIG. 6. It will be appreciated that by varying the length of the flange portion 28 which is disposed parallel to the web of an interior frame member for a window according to this invention, the window may be adapted for mounting to a wall of substantially any thickness encountered. In the case of camper trailers or the like, the wall panels may be up to 2 inches thick. In the case of thick walls, it may be expedient to eliminate flange portion 28 from the interior frame member (so that the interior frame member, in cross-section, resembles a rolled steel "Z" shape) and to reverse the relationship of the interior to the exterior frame member so that the wall is clamped between mounting flange 22 (or 43) and the leg portion 27 of the interior frame member; in such a case, the window opening in which the window is mounted must be sufficiently large that the web of the interior frame member may be disposed at least partially within the window opening.

In view of the foregoing description concerning FIGS. 4 and 6, it is apparent that a two-pane openable window not having a screen assembly 38 may be provided by using exterior frame member 12. In such a case, the movable pane of such a window is mounted in the channel defined between flange 20 and the adjacent pane flange 19.

FIG. 7 is a transverse cross-section view through the exterior and interior frame members 70 and 74 of another window according to this invention. Exterior frame member 70 includes several of the features of frame member 10 previously described with respect to FIG. 6; therefore, to the extent that frame members 10 and 70 have common features, common reference numerals are used. Frame member 70 differs from frame member 10 by the deletion in frame member 70 of stub flanges 23. The mounting function provided by stub flanges 23 of frame member 10 is provided, in part, by a connection web 71 of frame member 70. Connection web 71 extends parallel to web 18 from mounting flange 22 in spaced relationship to the side of web 18 opposite from which flanges 19 and 20 extend. The spacing of connection web 71 from web 18 is approximately equal to the thickness of web 18. (Webs 18 and 71 are of about equal thickness.) The width of the connection web 71, i.e., the dimension of the connection web normal to mounting flange 22 and parallel to the width of web 18, is slightly less than the distance between the opposing faces of flange 20 and mounting flange 22. The face of connection web 71 which opens to web 18 defines a plurality of serrations or teeth 72 which are asymmetrical in the manner shown in FIG. 7, i.e., the teeth tend to slant toward mounting flange 22 rather than toward the opposite unsupported edge of the connection web. Exterior frame member 70 preferably is used in combination with an interior frame member 74 which has a web 75. Web 75, when the interior frame member is viewed in cross-section as in FIG. 7, is straight and has a width which is less than the width of web 18 of exterior frame member 70. Interior frame member 74 also includes a flange 76 which extends from one side of web 75 along one edge thereof and which is arcuately curved so that its unsupported end 77 is disposed adjacent the opposite edge of web 75 but is spaced therefrom. Flange 76 is arranged so that the terminal portion of the flange adjacent end 77 extends parallel to web 75. The surface of web 75 which is disposed toward the unsupported end 77 of flange 76 defines a plurality of serrations or teeth 78 configured to mate with the serrations 72 defined by connection web 71 of the exterior frame member. Web 75 has a thickness which, making allowances for the presence of the serrations thereon, is equal to the spacing of connection web 71 from web 18 of exterior frame member 70.

Exterior frame member 70 may be used in the construction of a single-pane, fixed-pane window similar to window 10, or in the construction of a multi-pane unscreened window similar to window 21, both of which have been described above with respect to FIGS. 1 and 3, respectively.

A window incorporating exterior frame member 70 is inserted into a window opening 15 defined in a wall structure 16 from the exterior side of the wall according to the preceding description; such a window opening must be sized to permit the passage of connection web 71 at least partially through the window opening, as shown in FIG. 7. The mounting of the window to wall structure 16 is accomplished by inserting the web 75 of mating and correspondingly bent frame member 74 into the space provided between web 18 and connection web 71 of frame member 70. The interior and exterior frame members are then pushed together so that web 75 of the interior frame member advances toward mounting flange 22 of the exterior frame member within the space between webs 18 and 71 of the exterior frame member. Such engagement of the interior frame member to the exterior frame member is facilitated by the cooperating slope of serrations 72 and 78, and is continued until the unsupported end 77 of exterior frame member flange 76 abuts the interior surface of wall structure 16 circumferentially of window opening 15. In this manner, the window is secured in the window opening by being clamped between the interior and exterior frame members. The configuration of serrations 72 and 78 prevents disengagement of the interior and exterior frame members.

As with the windows previously described, it is presently preferred that frame members 70 and 74 be fabricated from extrusions of rigid synthetic resin, a presently preferred resin being B. F. Goodrich Chemical Company Geon 8700-A rigid polyvinyl chloride resin.

FIG. 8 is a transverse cross-sectional elevation view through the single frame member 80 of another window according to this invention. Preferably frame member 80 is fabricated from a straight length of extruded rigid polyvinyl chloride bent to the desired curvature pursuant to the method described below. Frame member 80 is particularly useful in the manufacture of windows adapted for mounting in thin wall structures 81 within a window opening 82 defined therein. The cross-sectional configuration of frame member 80 includes a web 83 which defines the width of the extrusion. It also includes a pair of pane flanges 84 and an additional flange 85, all of which are spaced substantially regularly from each other and which extend parallel to each other from one side of web 83. One of the pane flanges and flange 84 are disposed along opposite edges of the web. Flanges 84 and 85 all have the same extent normal to web 83. Frame member 80 also includes a mounting flange 86 which extends perpendicular to web 82 from the side of the web opposite to the side from which flanges 84 and 85 extend. Preferably mounting flange 86 is disposed substantially midway between the opposite edges of web 83.

It will be apparent from an inspection of FIG. 8 that frame member 80 may be used to advantage to define either a single-pane, fixed-pane unopenable window, similar to window 10, or a multi-pane openable window not including a screen but otherwise similar to window 21 shown in FIG. 3.

A window incorporating frame member 80 may be mounted in window opening 82 by means of a mounting and sealing member 88. Preferably the sealing member is fabricated of a flexible elastomeric material such as a flexible vinyl resin, neoprene rubber, or the like. Also, the mounting and sealing member may be provided as a closed loop resembling an enlarged O-ring, or as a strip of material which is cut to the appropriate length and fitted to thin wall 81 around window opening 82. Member 88, as shown in FIG. 8, is substantially rectangular in transverse cross-section, and defines a pair of aligned grooves 89 and 90 extending toward but not to each other from opposite edges of the member. Groove 89 has a width which is slightly less than the thickness of wall 81. Groove 90 has a width which is slightly less than the width of mounting flange 86 and preferably has a depth somewhat greater than the depth of the mounting flange. Frame member 80 of the completed window is secured in window opening 82 by first engaging the mounting and sealing member to the wall peripherally of the opening by seating the wall adjacent window opening 82 in groove 89. Thereafter, relying on the flexibility of the material from which the mounting and sealing member is fabricated, mounting flange 86 of the window is engaged in groove 90. In this manner, a secure and weather-tight mounting of the window within window opening 82 is accomplished.

FIG. 9 is an exterior elevation view of another window 95 according to this invention. Window 95 is shown to illustrate the point that a window according to this invention need not be generally rectangular in configuration. Window 95 has a generally trapezoidal overall configuration and the sight area 96 of the window similarly has a generally trapezoidal configuration with rounded corners 97, 98, 99 and 100. The frame of window 95 is fabricated from an extrusion of rigid thermoplastic resin (preferably a rigid vinyl resin) which has been bent to the desired configuration. Thus, the frame of window 95 includes two 90° bends of a first selected radius which define corners 97 and 98 of the sight area. The frame also includes a third bend of substantially the same radius as the bends defining corners 97 and 98, but which subtends an arc of less than 90°. Finally, the frame includes a fourth bend, corresponding to corner 100, which has a radius less than the radius of corner 97, for example, and for which the extruded frame material must be bent through an angle greater than 90°.

FIG. 9 also illustrates that the frame of window 95 preferably is provided in two pieces 101A and 101B, each of which has aligned ends disposed preferably along the parallel sides of the window, but which, during the manufacturing process, are interconnected to define an essentially integral frame for the window.

It is a feature of this invention that the frame members for the window contemplated hereby may be fabricated of a thermoplastic resin which itself defines the color desired for the completed window. Thus, a window according to this invention need not be painted. Also, the thermoplastic materials from which the frames are fabricated are not susceptible of corrosion. In presently preferred windows according to this invention, the frame members for the windows are defined by off-white extruded rigid polyvinyl chloride resin.

It is apparent from the foregoing description that windows according to this invention possess the advantages and benefits encountered in windows having extruded or stamped metal frames, yet they possess none of the disadvantages of windows having frames fabricated of vacuum-formed synthetic resin. Windows according to this invention may be provided in any configuration and in any frame color desired. Also, where the window is fabricated according to the following manufacturing processes, the window may be produced at low cost.

In the preceding description, reference has been made to extruded rigid polyvinyl chloride resin as a presently preferred material for the window frame members. This material is presently preferred largely because it is readily available at reasonable cost and can be formed in the manner contemplated by the following description of a method for bending complex shapes fabricated of thermoplastic resin. Those skilled in the art will readily appreciate that where these fabrication processes or other fabrication processes are employed, depending upon the properties of the particular resin, thermoplastic resins other than polyvinyl chloride may be used to provide extruded frame members for windows and the like according to this invention. Thus, this invention contemplates the provision of windows having frame members made of bent extrusions made of the following resins, among others:

acrylonitrile-butadiene-styrene resins
acetal homopolymers and copolymers
acrylic resins
chlorinated polyether resins
polyvinylidene fluoride resins
methylpentene polymers
nylon resins
polyarylsulfone resins
polypropylene
high impact polystyrene
styrene-butadiene resins
polysulfone resins
high density polyurethanes and
polyethylenes Also, this invention, as it pertains to the bending methods described below, contemplates that these resins may be encountered in the elements, preferably extruded elements, to be bent.

FIGS. 10-23 illustrate various mechanisms, apparatus and systems useful in bending to the desired curvature extruded frame members of the type described above concerning windows 10, 21 and 95, for example. Because the window structures described above preferably incorporate frame members fabricated of bent rigid vinyl extrusions, the structures and procedures illustrated in FIGS. 10-24 have been developed to implement the manufacture of such windows and are described in furtherance of a full and complete explanation of this invention, one aspect of which is the provision of these windows. It will be understood, however, that the bending structures, systems and features described below may be used to advantage in bending elements of complex cross-sectional configuration fabricated of thermoplastic resin whether or not such elements originally are produced by extrusion processes and whether or not such elements are to be used in windows or in some other product. Accordingly, this invention, in terms of the methods and procedures described below, and in terms of the apparatus for implementing such methods and procedures, contemplates that the thermoplastic elements to be bent may be fabricated by casting techniques, for example, as well as by extrusion. For the purposes of example, the methods, procedures, structures and systems illustrated in FIGS. 10-24 are described with reference to the bending of an extruded rigid polyvinyl chloride member having a cross-sectional configuration corresponding to the cross-sectional configuration of exterior frame member 12 shown in detail in FIG. 6 and described with reference thereto; this fact should not be regarded as restricting the use of these procedures and structures to the manufacture of windows such as the windows described above.

Briefly summarized, an elongate member of complex cross-sectional configuration, i.e. a shape as defined above, fabricated of rigid thermoplastic resin, is bent to a desired configuration while the cross-sectional configuration of the member is maintained over the arc of the bend. The shape is bent first by engaging a major portion of the cross-sectional configuration of the shape intimately with a bending die which is cooperatively configured to mate closely with the shape and to preserve the cross-sectional configuration thereof during the bending process. As mated with the bending die, the shape is heated, preferably by the application of a heating fluid directly to the shape via the bending die. The shape is heated to a temperature which is sufficiently elevated above ambient temperature that the thermoplastic material softens so as to lose a portion, but not all, of its rigid characteristics. That is, the shape, over the portion of the length thereof to be bent, is heated to a temperature which causes the thermoplastic material of the shape to soften and to lose a portion, but not all, of its tensile strength. Preferably, the temperature to which the shape is heated is a temperature which lies between the deflection temperature of the resin at 264 psi and the compression molding temperature for the resin. The bending die defines the curvature to which the shape is to be bent. Before the shape is actually bent to conform to the curvature of the bending die, a flexible second bending die is engaged with the remainder of the cross-sectional configuration of the shape. The flexible second die is then moved toward the first bending die, thereby to move the shape into intimate mating engagement with both dies over the length of the shape to be bent. The engagement of the shape between the bending dies is sufficiently forceful that the cross-sectional configuration of the shape is maintained during the bending process. Before the dies are separated from each other, the bent shape is cooled sufficiently to restore the sufficient tensile strength to the shape that the bent shape can be handled without distortion, and then the bent shape is removed from its engagement with the bending dies.

Figure 11:
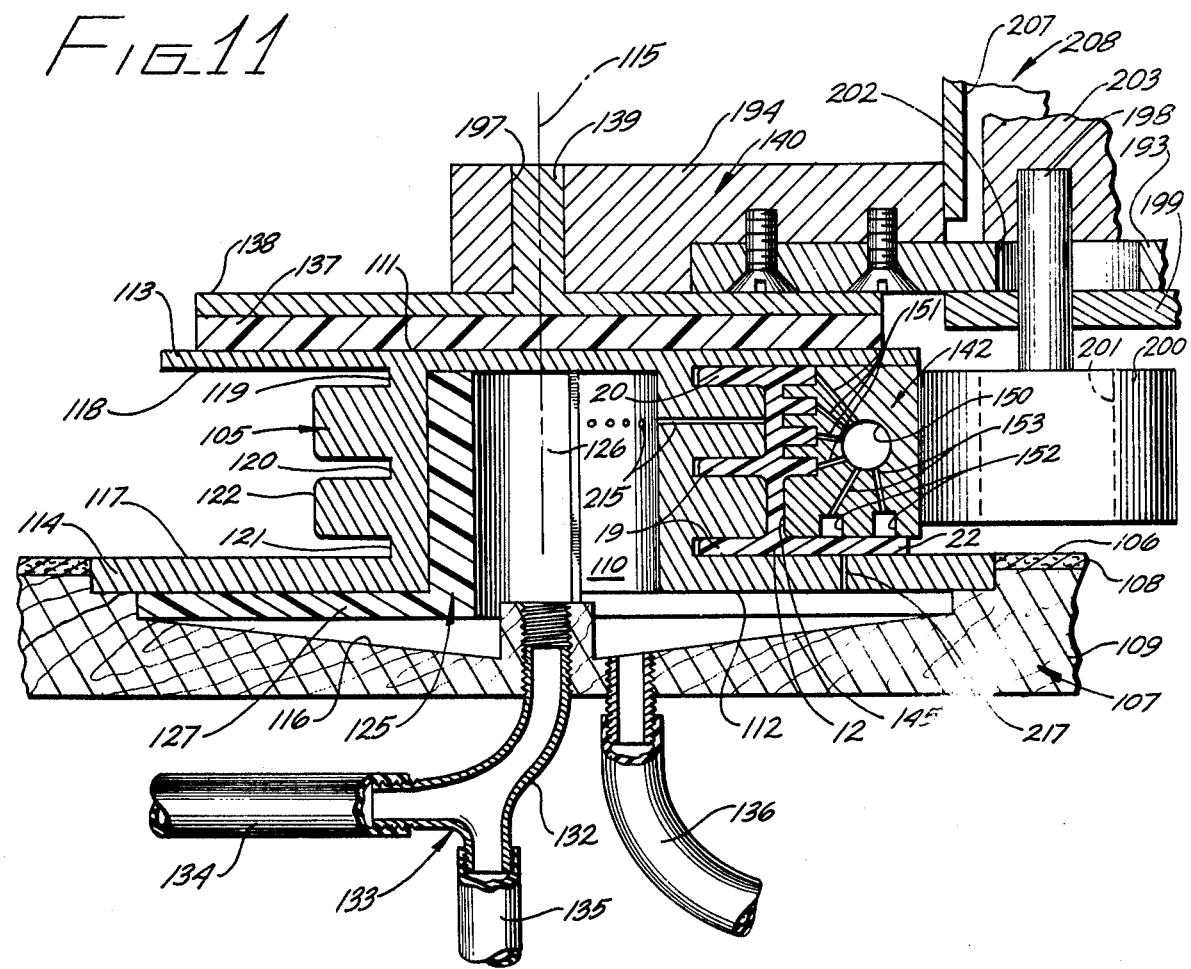
FIG. 11 is an enlarged cross-sectional elevation view of a rigid bending die.

As shown in FIGS. 10 and 11, a stationary rigid bending die 105 is mounted in the upper surface 106 of a support 107. Preferably, surface 106 is defined by a layer of laminated phenolic sheet material 108 (such as Formica-brand surfacing sheet material) bonded to a piece of wood 109 which is relied upon to define support 107. Laminated sheet material is preferred as the upper facing of support 107 because, in a presently preferred bending procedure, saturated steam is used as the heating fluid for the element to be bent and tends to condense on the upper surfaces of the support.

Bending die 105 preferably is provided in the form of a hollow, cylindrical metal drum having a center cavity 110, an upper end 111 and a lower end 112. Cavity 110 opens to die lower end 112, but not to die upper end 111. The exterior surface 122 of the die is formed to mate closely with a portion of the cross-sectional configuration of a thermoplastic member, such as exterior window frame member 12, to be bent. During the bending process, frame member 12 is intimately received with the exterior of the drum between an upper circumferential flange 113 and a lower circumferential flange 114 which extend parallel to each other radially of the axis 115 of the die. The die is mounted within a recess 116 formed in support 107 and so configured that the upper surface 117 of die lower flange 114 is coplanar with upper surface 106 of the support. The spacing between flange surface 117 and the lower surface 118 of upper flange 113 is only slightly greater than the width of frame member 12.

To facilitate intimate engagement of exterior frame member 12 with the circumference of die 105, three circumferential grooves are formed in die surface 122 between flanges 113 and 114. Accordingly, a first groove 119 is formed circumferentially of the die immediately adjacent surface 118 of upper flange 113 in such a manner that an extension of surface 118 forms one boundary of the groove. A second groove 120 is formed in tne die surface 122 essentially midway between flanges 113 and 114, and a third groove 121 is formed immediately adjacent surface 117 of flange 114 in such manner that flange surface 117 forms one boundary of groove 121. As is readily apparent from FIG. 11, grooves 119, 120 and 121 are adapted to receive flanges 20, 19 and 19, respectively, of exterior frame member 12. Therefore, the grooves have a width (i.e., a dimension parallel to die axis 115) equal to the thickness of the corresponding flanges of the exterior frame member. Grooves 119, 120 and 121, however, have a depth, i.e., a dimension radially of the die inwardly from die convex surface 122 (the same being a right circularly cylindrical surface) which is a small selected amount greater than the extent of flanges 19 and 20 from web 18 of exterior frame member 12. Accordingly, as shown in FIG. 11, exterior frame member 12 is adapted to be intimately engaged with and mated to die 105 over a substantial portion of its cross-sectional configuration. As is apparent from the illustration in FIG. 11, die flanges 113 and 114, when the exterior frame member 12 is engaged to the die, extend radially outwardly beyond the adjacent portions of the exterior frame member. Die convex surface 122 has a radius of curvature which corresponds to the radius of curvature to which web 18 of exterior frame member 12 is to be bent so as to assume concave curvature.

Bending die 105 is defined of a metal which has high thermal conductivity. Aluminum has been found to be a suitable die material since it readily conducts heat and is readily machined to the desired configuration.

A thermally insulative liner 125 is disposed within cavity 110 of die 105 as shown in FIG. 11. The liner may be fabricated of heat resistant phenolic resin or the like, if desired. The liner has a cylindrical portion 126 which is engaged with the walls of cavity 110 from the upper end of the cavity to the lower end of the cavity around only a portion of the circumference of the cavity. The liner also has a radial flange 127 at its lower end which is engaged within recess 116 with the underside of die member flange 114. Liner flange 127 encompasses the same arc around die 105 as does the liner cylindrical portion.

Referring to FIG. 10, assume that exterior frame member 12 is to be bent through an arc 129 of 90° by use of bending die 105. The portion of the circumference of cavity 110 which is not covered by cylindrical portion 126 of liner 125 subtends an arc 130 which is greater than arc 129. The value of arc 130 may be on the order of 110°, for example. As shown in FIG. 10, arcs 129 and 130 are arranged so that arc 129 is centered within arc 130. The function of liner 125 is to insulate the portion of the die member which lies outside of arc 130 from the heating action of heating fluid introduced into cavity 110 via a heating and cooling fluid inlet duct 132, which communicates through support 107 to cavity 110. It is desired, primarily because of considerations of thermodynamic efficiency and the elimination of safety hazards to personnel using bending die 105, that only the portion of die 105 lying within arc 130 be heated during use of the bending die. It is apparent, therefore, that it is within the scope of this invention that only the portion of bending die 105 defined within arc 130 need be made of thermally conductive material such as metal, and that the remainder of the circumference of the bending die may be made of some insulative material such as wood or "Bakelite" phenolic resin, if desired.

Preferably, duct 132 is relied upon to conduct both a suitable heating fluid to cavity 110 and, at different intervals during the bending of exterior frame member 12, to conduct a suitable cooling medium to cavity 110. Accordingly, duct 132 preferably is one leg of a Y connection 133. A heating fluid supply conduit 134 and a cooling medium supply conduit 135 are connected to respective ones of the other legs of Y connection 133.

In a presently preferred bending system according to this invention, the heating fluid supplied to die member 105 is saturated steam, which condenses within cavity 110 and recess 116 of support 107. To facilitate drainage of condensed steam from recess 116, a drain tube 136 communicates through the bottom of support 107 to the lowermost extremities of recess 116.

A piece of rigid, thermally insulative material 137 is secured to the upper end of die member 105 and carries a bearing plate 138 from which a spindle 139 extends upwardly along axis 115 of die 105. Spindle 139 is provided to define the fulcrum point for a bending handle assembly 140, described in detail below. In use of the apparatus illustrated in FIG. 11, the bending handle assembly bears against and is supported by bearing plate 138.

A flexible bending die 142 for use in cooperation with bending die 105 and exterior frame member 12 is shown in FIGS. 11, 15 and 16, as well as in other figures. Flexible die 142 preferably is defined by an elongate piece of hard rubber or similar material having a generally rectangular cross-sectional configuration. Accordingly, flexible die 142 has a top face 143, a bottom face 144 (see FIG. 16), a front face 145, and a rear face 146. The distance between top and bottom faces 143 and 144 of the flexible die is slightly greater than the distance between lower surface 118 of rigid die flange 113 and that surface of mounting flange 22 of exterior frame member 12 which is not engaged with die member flange 114 when the exterior frame member is intimately engaged with die member 105, as shown in FIG. 11. That is, the height of the flexible die member is selected relative to the dimensions of exterior frame member 12 such that, when the exterior frame member is mated to rigid die member 105, the flexible die member must be forced into the position shown in FIG. 11 between the exterior frame member and flange 113 of rigid die 105.

As shown in FIGS. 11 and 15, the front face 145 of the flexible die is configured to mate intimately with substantially all of that portion of the cross-sectional configuration of exterior frame member 12 which is not engaged by rigid die member 105 when the exterior frame member and the rigid die member are mated and frame member 12 has been bent to the desired curvature. That is, the configuration of the flexible die is such that the flexible die changes curvature to correspond to the curvature of member 12 as bent, rather than to the initial state of member 12 prior to bending; in so changing curvature to conform to the bent curvature of member 12, the flexible die member cooperates with the fixed-shape die 105 to maintain the initial transverse cross-sectional configuration of member 12. Accordingly, four elongate grooves 148 are defined parallel to each other within face 145. One of grooves 148 is defined jointly in front face 145 and top face 143 of the flexible die. The width of each of grooves 148 is equal to the width of each of stub flanges 23 of exterior frame member 12, and the depth of each groove 148 is equal to the extent of stub flanges 123 from the adjacent surface of web 18 of the exterior frame member. Similarly, the spacing between adjacent ones of grooves 148 is equal to the spacing between adjacent ones of stub flanges 23. Accordingly, flexible die 142 is readily matable with exterior frame member 12 in the manner illustrated in FIG. 11.

In a preferred bending procedure practiced according to this invention in connection with exterior frame member 12, it is preferred that the exterior frame member be heated over the portion of its length to be bent by heating fluid applied directly to the exterior frame member through flexible die 142. Accordingly, a bore 150 (see FIG. 11) is provided along a portion of the flexible die from one end 149 thereof in spaced relation to the bottoms of grooves 148 and in spaced relation to the exterior faces of the flexible die. At selected intervals along the length of the flexible die member, bore 150 is connected by passages 151 to the bottoms of each of grooves 148 (except that one of the grooves 148 defined conjointly by faces 143 and 145 of the flexible die member). Also, as shown in FIG. 16, a plurality of parallel grooves 152 are formed in bottom face 144 of the flexible die. Grooves 152 do not extend from end to end of the flexible die, but extend over a major portion of the length of the die parallel to front face 145. At selected intervals along their lengths, each of grooves 152 is connected to bore 150 by passages 153. A flexible heating fluid and fluid cooling medium supply duct 154 is connected to bore 150 at end 149 of the flexible die member, as shown in FIG. 15.

FIG. 20 is a largely schematic illustration of a bending system 156, according to this invention. As will be apparent from the following description, system 156 is a simplified system as compared to the system illustrated in FIG. 23. System 156 includes a rigid die 105 as described above, and a flexible die such as die 142 described above. As shown in FIG. 20, it is within the scope of this invention that the separate heating fluid and coolant medium supply ducts 134 and 135 may be combined into a single duct connected to the rigid die; accordingly, in FIG. 20, this unification of ducts is shown by duct 134/135 which, together with the flexible ducting from flexible die 142, is connected to a valving manifold assembly 157.

Valving manifold assembly 147 includes a heating fluid header 158 and a coolant medium header 159. A source 160 of heating fluid is connected to header 158 and a source of fluid coolant medium 161 is connected to header 159. It has been found that where the elongate thermoplastic member to be bent according to the procedures described herein has been fabricated of Geon 8700-A rigid polyvinyl chloride, saturated steam may be used to advantage as the heating medium. Accordingly, heating fluid source 160 preferably is a boiler 162 having a burner 163. The upper portion of the boiler chamber is connected via a duct 164 and a pressure regulating and relief valve 165 to heating fluid header 158. Preferably, valve 165 is set at a pressure only sufficiently above atmospheric pressure (say, about 5 psi) to assure flow of steam from the valve to dies 105 and 142. Similarly, where the elongate flexible member being bent is defined by Geon 8700-A rigid polyvinyl chloride, it has been found that compressed air may be used to advantage as a fluid coolant medium. Accordingly, source 161 of coolant medium is an air compressor 166 having its output connected to header 159 via an accumulator 167.

Duct 134/135 for rigid bending die 105 is connected to a duct 168 intermediate its ends which are connected to headers 158 and 159, respectively, via separate solenoid valves 169 and 170, respectively. Similarly, duct 154 for flexible bending die 142 is connected to a duct 171 intermediate its ends which are connected to headers 158 and 159, respectively, via separate solenoid valves 172 and 173, respectively. The solenoid valves 169, 170, 172 and 173 are separately operable under the control of a multi-position switch assembly 174 which is connected between the solenoid valves and a suitable source of electrical power 175.

Figure 12:
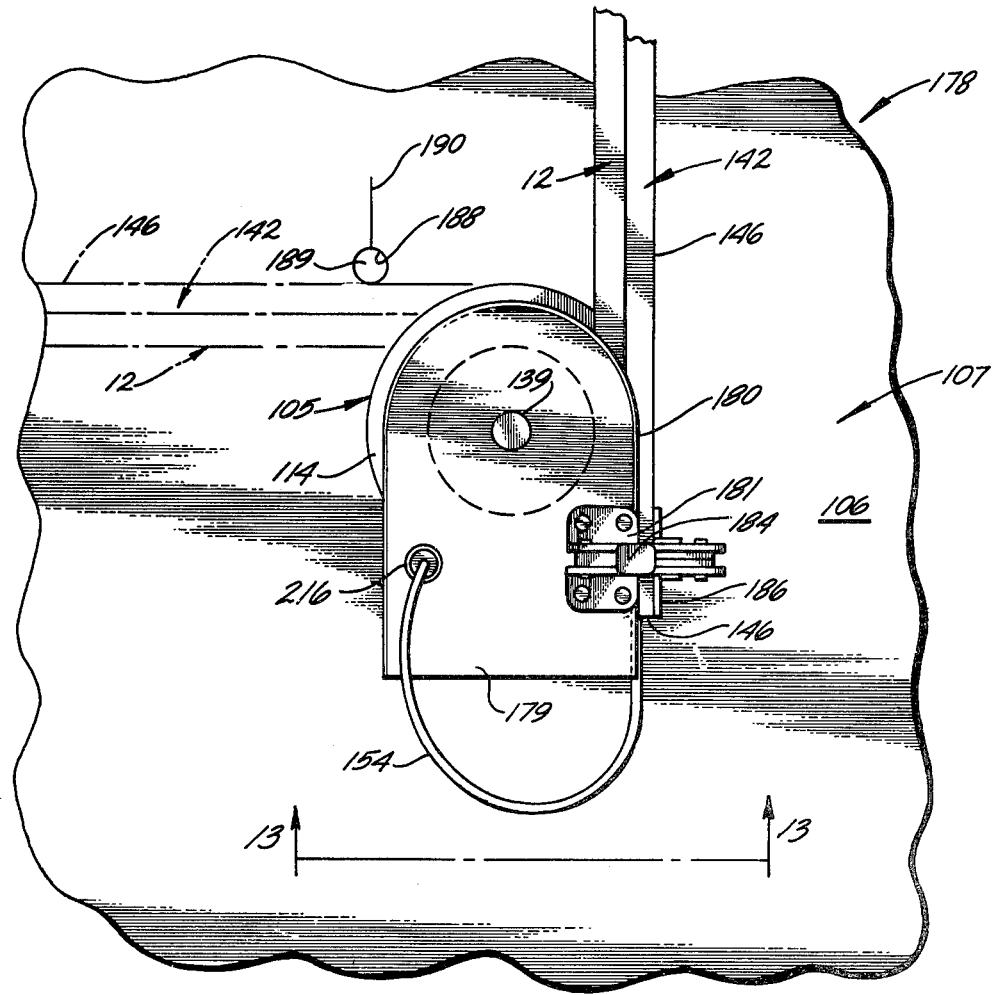
FIG. 12 is a top plan view of another rigid bending die and clamping station according to this invention.
Figure 13:
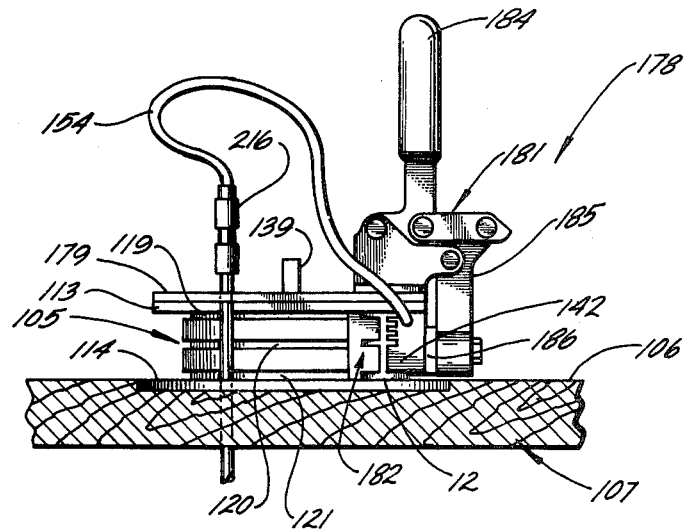
FIG. 13 is an elevation view taken along line 13—13 in FIG. 12.

The content of FIGS. 10 and 11 represents a simplified form of a presently preferred bending arrangement for use in practicing the method of this invention in the process of manufacturing the above-described windows. This simplification of structure has been adopted for FIGS. 10 and 11 so that the basic elements of the rigid and flexible bending dies of this invention may be understood readily. FIGS. 12 and 13 illustrate a presently preferred bending station 178 in which the structure of FIGS. 10 and 11 is incorporated. Accordingly, bending station 178 includes a rigid bending die 105 mounted in the upper surface 106 of a support 107. Bending die 105, illustrated in FIG. 13, is identical to the bending die described above with reference to FIG. 11 except that, in bending station 178, the bearing plate 138 mounted to the upper end of bending die 105 is extended to define a table 179 which has an edge 180 thereof extending generally parallel to a tangent to the curve to which exterior frame member 12 is to be bent; the tangent extends from one end of the arc along which the exterior frame member is to be bent. The table 179 is relied upon to mount a clamp mechanism 181 which is used to securely clamp exterior frame member 12, adjacent the portion thereof to be bent, between flexible bending die member 142 adjacent its end 149 and a backup block 182 (see FIG. 13). Backup block 182 is fixed to support 107 and to the underside of table 179, and provides support for table 179. A face of the backup block is configured to mate with substantially the same portion of the cross-sectional configuration of exterior window frame member 12 as is engaged by rigid bending die 105.

Clamp mechanism 181 preferably is a toggle-action clamping device which includes an operating handle 184 and a pivotable arm 185 connected to the operating handle and to the base of the device by a suitable linkage mechanism. Pivotable arm 185 carries a pressure pad 186 which, when a piece of exterior window frame member 12 is engaged with backup block 182 and flexible die member 142 is in turn engaged with the member to be bent, is movable into and out of secure and forceful clamping relationship with the rear face of the flexible die member adjacent its end 149; this is shown in FIGS. 12 and 13. A suitable form of clamping mechanism 181 is an ADB-60640 vertical angle toggle clamp obtainable from American Drill Bushing Company, 5107 Pacific Boulevard, Los Angeles, California 90058, modified in pivotable arm 185 thereof to carry pressure pad 186.

In the top plan view of FIG. 12, a piece of straight extruded shape material for exterior window frame member 12 is shown in solid lines in its unbent state. Similarly, flexible die 142 is shown in solid lines in FIG 12. Exterior window frame member 12 and flexible die 142 are shown in the position of the fully bent shape by the phantom line representation of FIG. 12, which illustrates that the shape is to be bent through a 90° angle in bending station 178. A hole 188 is formed in support 107 adjacent die 105 at a position which is immediately adjacent to the rear face 146 of flexible die 142 when the shape has been bent precisely through the arc desired and intimate mating engagement is maintained between the shape and the flexible die. Hole 188 is adapted to receive a pin 189 which bears against the rear face of the flexible die at the completion of the bending process to maintain the bent shape in the desired position while the material from which the shape is cooled is restored to at least a portion of its original rigidity. A mark 190 extends radially from hole 188 on surface 106 of support 107 so that the operator of bending station 178 can be alerted to the fact that the bending operation is nearing completion. Preferably the operator follows the rear face of flexible die 142 along mark 190 with pin 189 so that pin 189 is inserted into hole 188 at the instant that the rear face of the flexible die clears hole 188. In this manner, precise control over the exact angle through which shape 12 is bent is achieved.

It is apparent from the foregoing description of bending station 178 that use of the bending station to bend a rigid thermoplastic shape through the desired angle need not make allowances for resilient spring-back of the shape from an overbent state to the properly bent condition. In this regard, the practice of the method of this invention is contrasted with conventional practice for bending steel pipes in which an empirical allowance for resilient spring-back must be taken into consideration.

In the preceding description of FIG. 11, reference was made to a bending handle assembly 140 which is shown in FIG. 14. The bending handle assembly is used to move the shape for exterior window frame member 12, for example, into intimate mating engagement between rigid die 105 and flexible die 142 along an arc of die 105 subtending an angle equal to the angle to which the shape is to be bent. Bending handle assembly 140 is constructed so that this engagement of the shape between dies 105 and 142 is a forceful engagement which is effective to maintain the cross-sectional configuration of the shape throughout the extent of the bend. Bending handle assembly 140 includes an elongate rigid handle bar 193. A head block 194 is secured to one end of bar 193 so that the handle bar and the head block have coplanar bottom surfaces 195 and 196, respectively. These coplanar surfaces bear against bearing plate 138 during use of the bending handle assembly. A hole 197 is formed in head block 194 from bottom surface 196 along a line perpendicular to surface 196. Hole 197 is sized to snugly, yet movably, journal spindle 139 which extends upwardly from bearing plate 138 coaxially of rigid die 105.

A roller axle 198 extends through and is fixed to a slide plate 199 which extends along the underside of bar 193. A roller 200 is rotatably mounted to the lower end of axle 198 by a suitable bearing, such as a ball bearing assembly, 201. Axle 198 extends upwardly from slide plate 199 through a slot 202 formed in and aligned with the length of handle bar 193 adjacent head block 194. The upper end of axle 193 is fixed in a slide block 203 above the handle bar. The rear face of slide block 203, i.e., the face of the slide block opposite from head block 194, is engaged by a compression spring 204. The opposite rear end of the compression spring is engaged against the front face of a stop block 205 which is fixed to the handle bar. The front face of slide block 203 bears against the rear surface of the web 207 of a roller retracting lever 208. The front face of web 207 is urged by spring 204 into engagement with the rear end of head block 194. Retraction lever 208 is pivoted at 209 to handle bar 193 adjacent the rear end of head block 194. Accordingly, by pressing downwardly upon the rear end 210 of retraction lever 208, slide block 203 and roller 200 are moved rearwardly along handle bar 193 away from head block bore 197. Such movement of the roller relative to bore 197 requires movement of slide bar 199 along handle bar 193, and this movement is facilitated by a guide slot 211 formed through the slide bar adjacent its rear end. A guide pin is fixed to handle bar 193 adjacent its rear end and extends through guide slot 211. A knob 213 is rotatably mounted to the rear end of handle bar 193 so that an operator of bending station 178, for example, may conveniently turn handle bar assembly 140 about spindle 139.

The force applied by spring 204 to slide block 203, and thereby to roller 200, is a substantial force on the order of about 90 lbs. Referring to FIG. 11, the distance between axis 115 of die 105 and the rear face of flexible die 142, when the flexible die is mated to shape 12 as shown in FIG. 11, is greater than the normal or at-rest distance between the axis of bore 197 to the closest point of roller 200. Accordingly, as shown in FIG. 11, when roller 200 is engaged with the rear face of flexible die 142, slide block 203 is displaced rearwardly along handle bar 193 from head block 194 so that the full force developed by spring 204 is applied to the rear face of flexible die 142 by roller 200. This force is in turn transferred through the flexible die to shape 12 to urge the shape into intimate mating contact with both of dies 105 and 142.

Referring to FIGS. 10, 11, 12, 13 and 20, a presently preferred procedure for bending a piece of extruded stock material of exterior frame member 12 is set forth with reference to the foregoing description of apparatus for performing this process. A piece of extruded shape material for exterior window frame member 12 is engaged with backup block 182 in bending station 178. This engagement involves the mating of flanges 19 and 20 of shape 12 with the corresponding grooves of the backup block and the positioning of the shape relative to the backup block so that the shape is tangent to and is mated with die 105 at one end of the portion of the length of the shape which is to be bent through a 90° angle around rigid die 105. Next, flexible die 142 is engaged with the remaining portion of the cross-sectional configuration of the shape along the shape extending away from backup block 182. Clamping device 181 is then operated to cause pressure pad 186 to move into forceful engagement with the rear face of flexible die 142 opposite backup block 182. This operation of the clamping device causes the shape to be intimately and forcefully mated between the backup block and the flexible die so that the shape is held securely in place and cannot slip relative to stationary die 105.

After the shape for exterior window frame member 12 is clamped between back up block 182 and flexible die 142, bending handle assembly 140 is engaged with spindle 139. To accomplish this, roller retraction lever 208 is depressed to cause roller 200 to move away from the pivot axis of the bending handle assembly sufficiently that, as the bending handle assembly is engaged with spindle 139, roller 200 is moved into position adjacent the back face of flexible die 142 adjacent the point at which the shape is tangent to stationary die 105. The roller retraction lever is then released so that the force developed by spring 204 is applied via roller 200 to the flexible die and to the shape to cause the shape to be intimately engaged between the dies, as shown in FIG. 11.

Since it is desired that, during the bending process, stub flanges 23 and mounting flange 22 of the shape not be allowed to collapse or buckle as they experience tension during bending, it is necessary that the force developed by spring 204 be applied effectively to these features of the shape to provide the necessary anti-buckling support. For this reason, it is desired that flexible die 142 be fabricated of a relatively hard elastomeric material; the use of an overly soft elastomer for die 142 results in absorption and improper transmission of the force applied to the die by roller 200 and also results in a flexible die which is difficult to engage with the shape to be bent. Preferably, where the flexible die has the configuration shown in FIG. 11, for example, the flexible die is fabricated of neoprene rubber and has a hardness in the range of 60 to 80 Shore; a hardness of about 80 Shore is preferred. Neoprene rubber is preferred because this rubber is resistant to the heat applied to it during performance of the bending process.

Switch 174 (see FIG. 20) is then operated to open solenoid valves 169 and 172 to supply saturated steam to the rigid and flexible dies. In view of the foregoing description, it will be apparent that this stream is effective to heat the portions of die 105 which are not shielded by liner 125 to about the temperature of saturated steam, i.e., about 212° F. This heat is conducted by the metal of die 105 to those portions of the shape which are engaged with the rigid die. Also, steam is conducted from cavity 110 within die 105 through passages 215 from cavity 110 directly into contact with the shape at web 18 adjacent stub flanges 23. Preferably, a plurality of passages 215 are provided from cavity 110 to die surface 122 around the circumference of the cavity. Accordingly, live saturated steam is directed into contact with the shape along the length thereof from the point at which the shape is intimately mated to the rigid die. Similarly, because conduit 154 for flexible die 142 is connected to duct 171 via a quick-disconnect fitting 216 above table 179 (see FIGS. 12 and 13), it is apparent that opening of solenoid valve 172 also causes live saturated steam to be supplied to the flexible die. This steam is in turn conducted directly into contact with mounting flange 22 and stub flanges 23 of the shape along the length thereof engaged by the flexible die. Thus, opening of solenoid valve 169 and 172 causes the shape of exterior window frame member 12 to be heated along the length thereof sufficiently to cause the material from which the shape is made to soften.

Where the shape is fabricated of Geon 8700-A rigid polyvinyl chloride, the material is heated to a temperature which lies between the deflection temperature of the resin at 264 psi and the compression molding temperature of the resin. The deflection temperature at 264 psi for Geon 8700-A polyvinyl chloride is stated by the manufacturer to be 157° F. The compression molding temperature for rigid polyvinyl chloride polymers and copolymers is in the range of from 285° to 400° F. (see 1970/1971 *Modern Plastics Encyclopedia*, McGraw-Hill, Inc. at page 786). When Geon 8700-A rigid polyvinyl chloride is heated to a temperature about 212° F., it loses a substantial portion, but not all of its tensile strength and becomes sufficiently pliable that it can be bent, provided that sufficient force is applied to the heated material.

The application of steam to the shape via dies 105 and 142 is continued for about 15 to 30 seconds before the operator begins to turn the bending handle assembly about spindle 139. This initial exposure of the shape of the heating fluid (in this case, steam) is sufficient to condition the shape for bending. It is noted, however, that a longer or shorter conditioning period may be required where a shape of different composition is being bent or the heating fluid is a fluid other than saturated steam.

Bending of the conditioned shape is produced as the bending handle is rotated about spindle 139. This movement of the bending handle, because of the bias applied by spring 204 to the flexible die, causes the shape to move into intimate mating engagement with die 105 progressively around the circumference of the die from its initial point of tangency to the rigid die. The application of heat to the shape is continued as the bending handle is turned about spindle 139. Continued heating of the shape during bending may be achieved by continuing the application of steam to the shape via dies 105 and 142. Alternatively, continued heating of the shape may be achieved by the transfer of stored heat from the thermoconductive rigid die to the shape following closure of valves 169 and 172. Movement of the bending handle around the spindle is continued until the rear face 146 of the flexible die moves into the position shown in dashed lines in FIG. 12. At this instant, the shape will have been bent through an arc of 90°. Pin 189 is then placed into hole 188 in die support 107 and the bending handle is left in position adjacent the pin. The engagement of pin 189 and roller 200 with the back face of the flexible die maintains the flexible die in intimate and forceful mated engagement with the bent shape.

After pin 189 has been inserted into its receiving hole, switch 174 is operated to close solenoid valves 169 and 172 (if they have not previously been closed) and to open solenoid valves 170 and 173. By this operation of switch 174, compressed air is supplied to dies 105 and 142. This compressed air flows through passages 151, 153 and 215 and around the bent shape to the atmosphere, and in so doing cools die 105 and extrusion 12. Also, the air evaporates condensed steam which will have collected in the dies and in the passages from the dies to the shape, and this evaporation results in further cooling of the bent shape. The net effect is that after about 20 seconds the shape in the area of the bend and adjacent thereto is cooled sufficiently to restore enough rigidity to the shape that it may safely be removed from the dies without deformation from its bent state. Solenoid valves 170 and 173 are then closed, handle assembly 140 is removed, clamping device 181 is opened, pin 189 is removed from hole 188, and the bent shape is removed from engagement with dies 105 and 142.

From an examination of FIG. 11, for example, it is apparent that as the shape for the exterior window frame member 12 is bent to conform to the convex curvature of die 105 around a predetermined extent of the circumference of the die, flanges 19 and 20 of the shape undergo compression and stub flanges 23 and mounting flange 22 experience tension. Because flanges 19 and 20 lie on the side of web 18 which is bent to concave curvature, it is apparent that the effective length of the flanges, along the length of the bend, must be reduced; the neutral axis of the window frame member section substantially coincides with web 18. Accordingly, during the bending process, flanges 19 and 20 increase in depth, i.e., in their distance normal to web 18 to accommodate the effective reduction in their length. It is for this reason that grooves 119, 120 and 121 of die 105 are made deeper than the original depth of flanges 19 and 20. On the other hand, it is apparent that mounting flange 22 and stub flanges 23 experience tension, and these features of shape 12 over the length thereof around the bend are reduced slightly both in thickness and in depth from web 18. Intimate mated engagement of essentially all of the cross-sectional configuration of shape 12 with dies 105 and 142 during the bending operation is desired to prevent buckling or collapse of these features of the shape. Such collapse heretofore has been a common failure in prior attempts to bend thermoplastic shapes having complex cross-sectional configurations similar to that of frame member 12. The abovementioned hardness of die 142 is relied upon to prevent flanges 22 and 23 from collapsing during bending. Also, since it is the configuration of the shape as bent which is of concern, the flexible die 142 (and similarly with flexible die 220 described below) is arranged to deform during the bending process to the desired final configuration of the shape as bent. Thus, it is contemplated that the flanges of shape 12 may buckle slightly during the initial stages of bending, but the effects of such buckling are removed in the terminal stages of the bending operation by reason of the intimate and forceful mating of the dies to the shape at the conclusion of the bending operation.

It has been found that if the material from which the shape being bent is fabricated is heated to too high a temperature prior to and during the actual bending operation, the material of the shape tends to tear or fracture in those portions experiencing tension. For example, in the case of an extruded shape having the configuration shown in FIG. 11 and fabricated of Geon 8700-A rigid polyvinyl chloride resin, the shape was heated for bending in an oil bath having a temperature of approximately 275° F. When this shape was subjected to bending in the manner described above, it was found that mounting flange 22 tore readily even though the rate of advance of roller 200 around the periphery of die 105 was slow. It is apparent, therefore, that for proper bending of thermoplastic shapes of complex cross-sectional configuration, it is desirable that the thermoplastic material not be heated to too great a temperature prior to and during the bending operation. It is desired that the thermoplastic material be heated to a temperature sufficient to cause the material to experience a reduction in its tensile strength, but that such temperature be insufficient to cause the material to lose all of its tensile strength. Accordingly, the temperature to which the thermoplastic material being bent is heated is a temperature which is below the compression molding temperature for that particular resin. The compression molding temperature for the resin is essentially that temperature at which the resin behaves essentially like a liquid and not like a solid. Also, in view of the foregoing description, it is apparent that some portions of the thermoplastic shape being bent experience compressive stresses during the bending operation. In view of this fact, it is desirable that the thermoplastic material be heated sufficiently that the portions of the shape experiencing compressive stresses be allowed to flow as though the material were being compression molded. In view of these competing effects and the considerations pertinent to them, it is desirable that the temperature of the heating fluid applied to die 105 and, preferably directly to the thermoplastic material via both die 105 and flexible die 142, be at a temperature which is toward the middle or lower portion of the temperature range between the compression molding temperature for the thermoplastic material and the deflection temperature at 264 psi for the thermoplastic material. Where the thermoplastic material is Geon 8700-A rigid polyvinyl chloride, the temperature of saturated steam, i.e., about 212° to 220° F., has been found to be very satisfactory in enabling efficient practice of this invention.

In the preceding description, reference has been made to a unitary flexible die member 142 fabricated of relatively hard elastomeric material. It was noted above that hardness of the elastomeric material is desired in order that the forces developed by the spring of bending handle assembly 140 may be efficiently transferred to the thermoplastic shape being bent so that the cross-sectional configuration of the shape is maintained as it is bent. FIGS. 17, 18 and 19 illustrate another flexible die means 220 which may be used to advantage in the practice of this invention. Die means 220 is fabricated of a plurality of rigid metallic elements which are movable relative to each other from a state in which they can conform intimately with an unbent thermoplastic shape; the relative movability of the rigid die elements allows them to maintain such intimate engagement with the shape as it is bent to the desired configuration in the manner described above.

Accordingly, flexible die means 220 includes a plurality of essentially identical metal die segments 221 which, when intimately mated to each other in the manner shown in FIG. 19, cooperate to define a segment of a ring which has concave curvature which is a mirror image of the convex curvature assumed by the web of exterior window frame 12, for example, to be bent. Each of die segments 221 has end faces 222 and 223, a die face 224 and a back face 225. Each of die faces 224 has a curvature which corresponds to the curvature of the inner radius of the ring-like assemblage which is formed when the die segments are mated as shown in FIG. 19. End faces 222 and 223 converge toward each other and are arranged so that, when the die segments are arranged in the ring-like manner previously mentioned, they all converge at the center of curvature of the ring. Each die segment also has top and bottom surfaces 226 and 227 which are spaced apart from each other a distance equal to the distance between top and bottom faces 143 and 144 of flexible die 142. Die faces 224 are configured to define a plurality of parallel grooves 228 which are duplicates in width, depth and spacing of the grooves 148 provided in flexible die 142.

Die segments 221 are interconnected by a flexible connection mechanism which, in a preferred form of flexible die means 220, is a length of bicycle chain 230. Each die segment is connected to the chain by a screw 231 passed through an appropriate one of the several links of the chain, and into threaded engagement with the die segment via the rear face 225 thereof. The die segments are spaced appropriately along chain 230 so that, when the chain is flexed or moved, the die segments may be brought into serial engagement with each other with end surface 223 of each segment registered with end surface 222 of the adjacent die segment; this relationship is shown clearly in FIG. 19. To assure proper registry of the die segment end surfaces with each other in the manner shown in FIG. 19, each die segment defines a set of mating projections and recesses. Accordingly, a position-keying projection 232 extends from each end face 223 adjacent the upper surfaces 226 of each die segment. Also, each die segment defines a mating recess 233 in end surface 222 thereof adjacent the upper surface of the die segment. Accordingly, as the chain is bent to move the die segments into registry with each other, each of projections 232 engages in the adjacent one of recesses 233 so that die segment end surfaces 222 and 223 not only abut each other, but exactly register with each other so that die surfaces 224 form a smoothly curved portion of a right circular cylinder, for example.

To enable application of heating fluid to the flexible die means, and via the flexible die means to a thermoplastic shape undergoing bending, a flexible heating fluid supply tube 235 is threaded through corresponding aligned bores 236 provided through each of the die segments. Bores 236 have a diameter which is greater than the outer diameter of tube 235 so that, as the die segments are moved into and out of mating engagement with each other, tube 235 may slip within bores 236. One end of tube 235 is fixed to the die segment at one end of the series of segments, as shown in FIG. 19. This die segment carries a tubing fitting 237 which adapts tube 235 to be connected to a flexible heating fluid supply conduit 154. The opposite end of tube 235 is disposed exteriorly of the die segment at the opposite end of the series and is closed or sealed by any suitable mechanism. Preferably tube 235 is fabricated of nylon. Tube 235 is perforated as at 238 at spaced locations along tube 235 which correspond to the interfaces between the end surfaces of adjacent die segments. Thus, when heating fluid or fluid cooling medium is supplied to tube 235 and the die segments are not registered with each other but are mated with a thermoplastic shape to be bent, the heating fluid or the fluid cooling medium, as appropriate, is discharged from tube 235 into contact with the shape. A portion of this discharge also heats or cools the adjacent die segments. It is apparent, therefore, that flexible die means 220 may be used to advantage in place of flexible die 142, described above, to practice this invention.

To enable one end of flexible die means 220 to be fixed in position relative to the rigid die in much the same manner that the end of flexible die 142 is held in position by clamp assembly 181, the end of chain 230 adjacent tubing fitting 237 defines an aperture 239. By means of aperture 239, chain 230 may be engaged with a suitable pin fixed to support 107 at the desired location relative to the rigid die with which the flexible die means is configured to cooperate.

In the preceding description of windows 10, 21 and 95, it was observed that the exterior and interior window frame members may be bent in one piece to the desired configuration, if desired. The preceding description of the bending of exterior window frame member 12 has been presented in the context of a single rapid die 105 as a part of the bending apparatus. Obviously, in order that the interior or exterior window frame member may be bent to its ultimate curvature from one piece of extruded frame shape material, a bending apparatus incorporating as many rigid bending dies as there are bends is required. Such a bending apparatus 240 is shown in FIG. 21.

Bending apparatus 240 includes four rigid bending dies 241, 242, 243 and 244 corresponding to the bends of the exterior frame member of window 95 which are associated with corners 97, 98, 99 and 100, respectively. As shown in FIG. 21, rigid dies 241, 242 and 243 are not completely cylindrical, but rather, when viewed end-on, are seen to have a circumference which is only a portion of the circumference of a circle. Since frame member 12 is to be bent at each of these dies through an arc of 90° or less, it is not necessary that the die encompass an arc of 360°.

Dies 241, 242, 243 and 244 are mounted in corresponding recesses 245 formed in the upper surface 246 of a suitable support 247. For reasons which will be apparent from the following description, recesses 245 are elongated to permit movement of the respective dies laterally relative to support 247. Recesses 245 are arranged so that the upper surfaces of the lower die flanges of each of dies 241 through 244 are coplanar with support upper surface 246. Except for the fact that dies 241, 242 and 243 do not have die surfaces extending for an arc of 360° around the axis of the die surface, these dies and die 244 are generally in accord with the foregoing description concerning die 105.

In FIG. 21, broken line 249 represents the line along which the web of exterior window frame member 12 will lie when an appropriate length of extruded shape material has been bent to the desired configuration for window 95, for example.

A clamping station 250 is provided adjacent each of the rigid dies of bending apparatus 240. Each clamping station includes a clamping device 181, according to the foregoing description, which is mounted to the upper portion of a suitable backup block 182 which, in turn, is fixed to the upper surface of support 247. In FIG. 21, only two clamping stations are shown in detail, the locations of the remaining two clamping stations being represented by areas 251.

To provide plural bends in a single length of window frame shape material, a single flexible die having an extended-length at least equal to the total length of line 249 may be used. Such an extended-length of flexible die member may be of the type represented by flexible die 142 or of the type represented by flexible die means 220. It is preferred, however, that one or two shorter length flexible dies, preferably of the type exemplified by flexible die 142, be used in bending apparatus 240; these flexible dies are used in cooperation with rigid dies 241, 242, 243, and 244 as the several bends of the window frame member are made. It is for this reason, among others, that a clamping station is provided adjacent each of the four dies of bending apparatus 240.

As shown in FIG. 22 which pertains to die 244 but is typical of the mounting arrangements for dies 241, 242, and 243, rigid die 244 is mounted on the upper end of a hollow shaft 255. Shaft 255 extends through an elongate slot 256 formed through support 247. Slot 256 is aligned along the bisector of the included angle associated with the bend to be made in window frame member 12 by use of the corresponding rigid die. Each of recesses 245 is aligned with corresponding slot 256. Shaft 255 extends through slot 256. The lower end of shaft 255 is closed, as by a plug 258, and to which leg 132 of Y fitting 133 is connected. The interior of shaft 255 communicates to the cavity provided within die 244. Accordingly, heating fluid or fluid coolant medium may be supplied to the cavity within die 244 via shaft 255. Shaft 255 is connected to the piston rod 259 of a double-acting pneumatic cylinder assembly 260 which has its cylinder 261 mounted to the underside of support 247. Cylinder assembly 260 is disposed adjacent that end of slot 256 which lies adjacent the center of the area enclosed by line 249 in FIG. 21. The cylinder assemblies are so mounted to the support that piston rods 259 are reciprocable along lines aligned with the lengths of slots 256. When the pneumatic cylinder assemblies are actuated, i.e., in their extended states, the rigid dies are disposed on support 247 in the positions corresponding to the bends of line 249.

Figures 23, 24:
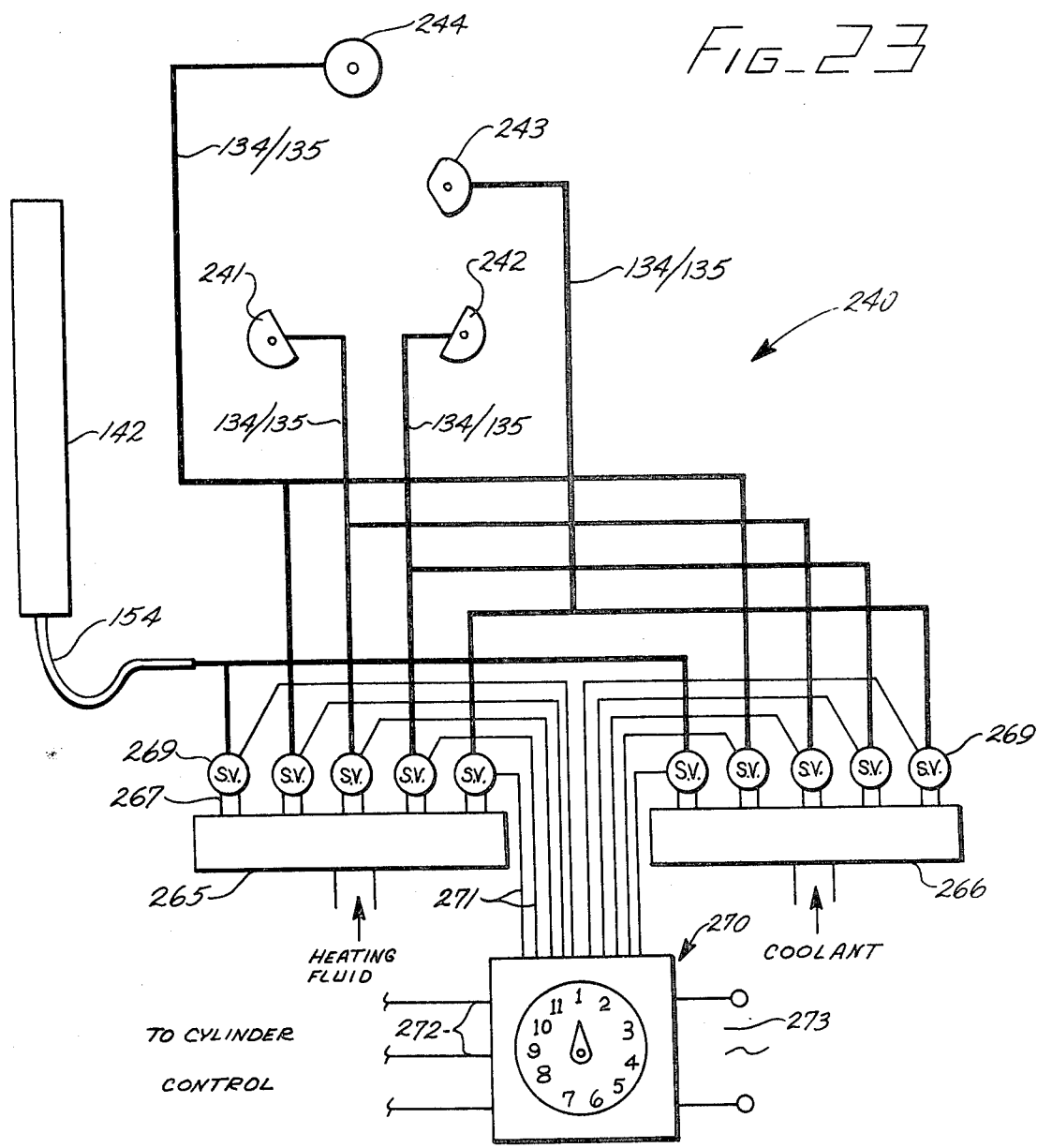
FIG. 23 is a schematic diagram of a multi-die bending apparatus according to this invention.
FIG. 24 is a chart presenting the operational sequence which is presently preferred for the system illustrated in FIG. 23.

The operation of bending apparatus 240 is best explained by reference to FIG. 23 which is a schematic diagram of the electrical and fluid flow ducting systems associated with this bending apparatus. The convention of unified heating fluid and fluid coolant medium flow ducts 134/135 previously used in the description of FIG. 20 is adopted in the illustration of FIG. 23. As shown in FIG. 23, bending apparatus 240 includes a heating fluid header 265 and a fluid coolant medium header 266. Five branch ducts 267 and 268 extend from each of headers 265 and 266, respectively, and each branch duct is fitted with a solenoid valve 269. The operation of solenoid valves 269 is controlled by a multi-position switch assembly 270. In the case of bending apparatus 240, multi-position switch 270 has eleven operative positions. Switch 270 is connected by suitable conductors 271 to the several solenoid valves and also by additional conductors 272 to a suitable solenoid valve pneumatic cylinder control mechanism (not shown). It is believed that the details of a suitable pneumatic cylinder control mechanism are readily apparent to one of ordinary skill in the art to which this invention pertains, and thus such a control mechanism is not illustrated or described in detail. Switch assembly 270 is connected to a suitable source of electric power 273. Each one of unified fluid flow conduits 134/135 for dies 241 through 244 has associated with it one solenoid valve of the heating fluid header arrangement and one solenoid valve of the fluid coolant medium header arrangement. Similarly, duct 154 for flexible die member 142 is coupled to a heating fluid controlling solenoid valve and a fluid coolant medium controlling solenoid valve.

FIG. 24 is a table which describes the operation of bending apparatus 240 in terms of the eleven operative positions of switch assembly 270, when the bending apparatus is used to bend a window frame for window 95, for example. In bending a frame member for window 95, it is presently preferred that the bending operation be carried out on a single piece of extruded window frame shape material cut to the appropriate length, and that the bends be made proceeding along the length of the shape commencing with the bend associated with corner 99 in window 95. Accordingly, in the table of FIG. 24, die 243 is referred to as Die No. 1, and similarly, dies 244, 241 and 242 are referred to as Dies 2, 3 and 4, since these dies are used for making the second, third and fourth bends, respectively. Also, in the table of FIG. 24, the single flexible die 142 is referred to as a shoe. The notation "HF" indicates that heating fluid is applied at that stage in the bending process to the appropriate rigid die or to the bending shoe, whereas the symbol "C" indicates that fluid cooling medium is applied to the appropriate rigid die or to the shoe at that stage in the bending operation.

As indicated in FIG. 24, the first operative position of switch assembly 270 provides an "actuate" signal via conductors 272 to the control mechanism for double-acting pneumatic cylinders 260. Accordingly, when switch 270 is disposed in its No. 1 position, compressed air is applied to each of cylinder assemblies 260 to cause the pistons thereof to move so as to drive the several rigid dies to the positions shown in FIG. 21. The suitably cut shape material is then engaged with the clamping station associated with the No. 1 die, i.e., rigid die 243. The shape is positioned so that the major portion of the length of the shape extends to the left beyond rigid die 243 from the clamping station and is tangent to the rigid die. A flexible die is also engaged with the clamping station in the manner described above concerning FIG. 11, for example, and the clamping device 181 closed. Bending handle assembly 140 is then engaged with spindle 139 of rigid die 243. Switch assembly 270 is then operated to its No. 2 position which, as shown in the table of FIG. 24, causes heating fluid to be applied to rigid die 243 and to the flexible die at rigid die 243. The bending handle is then turned about spindle 139 of die 243 until a bend of the appropriate curvature and extent has been formed into the shape around die 243. Switch 270 is then operated to its No. 3 position to cause fluid coolant medium to be applied to die 243 and to the flexible die to restore the rigidity to the shape adjacent die 243. Bending handle assembly 240 is then removed from engagement with the pivot spindle of this die.

The flexible die 142 is then moved to the clamping station associated with the No. 2 die, i.e., rigid die 244, and at such station is engaged in intimate forceful mating contact with the extruded stock material which, because of the bend formed therein at die 243, is registered with the backup block adjacent die 244 and with the periphery of rigid die 244; the backup block adjacent die 244 serves as a stop for the bending operation performed at die 243, thereby assuring that the shape is bent at die 243 only through the arc desired. (If desired, a second flexible die may be used to make the bend at rigid die 244, the flexible die at rigid die 243 being left in place until the bend at die 244 is completed and then being moved for use with rigid die 241.) Where only a single flexible die is used, it is noted that during this repositioning of the flexible die from rigid die 243 to rigid die 244, compressed air is applied to the flexible die via flexible conduit 154, but this fact does not hinder relocation of the flexible die within bending apparatus 240. After the flexible die has been engaged to the shape at and adjacent rigid die 244 and securely clamped in the clamping station at that location, the bending handle assembly is engaged with spindle 139 for rigid die 244. Switch 270 is then operated to its No. 4 position. Operation of the switch to its No. 4 position is effective to cause continued application of compressed air to the bent shape at die 243, but to cause heating fluid to be applied to dies 244 and 142. While the switch is in its No. 4 position, the appropriate bend is produced in the shape at rigid die 244. Before the bending handle assembly is removed from die 244, switch 270 is operated to its No. 5 position to cause compressed air to be applied to dies 243, 244 and 142. The bending handle assembly is then removed from die 244 and the flexible die is removed from its engagement with the clamping station associated with such die.

Then, as is apparent from the tabular presentation of FIG. 24, the same processes as those already described are carried out in sequence at rigid dies 241 and 242 to produce the third and fourth bends of the desired window frame member. This operation involves progressive disposition of switch assembly 270 in positions Nos. 6-10. After all four bends have been made in the shape, switch assembly 270 is placed in its No. 11 position which is the "deactuate" position for pneumatic cylinder assemblies 260. In the No. 11 position of the switch, piston rods 259 are retracted to cause the several rigid dies of bending apparatus 240 to move away from the bent shape toward the center of the area bounded by line 249 in FIG. 21. The several dies are moved toward each other an amount sufficient to completely clear the bent shape from the several rigid dies so that the shape may be lifted out of bending apparatus 240. The bent window frame member is then cut into two pieces, preferably at a location between the bends made at dies 244 and 241, to facilitate assembly of the window by the procedures described above. On the other hand, the retractability of rigid dies 241 through 244 may be omitted and the bent window frame member may be cut into two pieces while it is still engaged with the rigid dies at the completion of the bending process. It is apparent that where the rigid dies are not retractable, as described above, the bent shape cannot be removed from the bending apparatus unless it is cut into two pieces.

In the preceding description, the bending of rigid thermoplastic members of complex cross-sectional configuration, in a manner preserving such cross-sectional configuration, has been described with reference to certain procedures and apparatus which are presently preferred for use in manufacturing the windows illustrated in FIGS. 1-9, for example. It will be appreciated that these procedures and apparatus may be used to advantage to produce articles other than the frame members of the above-described windows. Therefore, it should be understood that reference to window frame member 12 and to the particular material from which this presently preferred extrusion is fabricated has been made merely for the purposes of example and illustration. Thus, those skilled in the art to which this invention pertains will appreciate that the procedures and apparatus described concerning FIGS. 10–24 may be used with thermoplastic members of complex cross-section which need not be formed by extrusion techniques and which may be fabricated of materials other than the particular rigid polyvinyl chloride referred to above. Also, workers skilled in the art to which this invention pertains will readily appreciate that the particular procedures and structures described above may be modified or altered to suit specific other members to be bent, and materials of composition thereof, without departing from the scope of this invention.

What is claimed is:

1. A method of bending, without significant distortion of the cross-sectional configuration thereof, an elongate non-tubular element fabricated of substantially rigid synthetic thermoplastic material and having, at any point along the length thereof transversely of the length thereof, a complex cross-sectional configuration including a web and a flange extending a substantial distance therefrom sufficiently that the element has preferential directions of bending and the cross-sectional configuration thereof has substantial susceptibility to significant distortion of the geometry thereof during bending, the method comprising the steps of
  (a) intimately mating the element between first and second dies cooperatively configured to define the curvature and configuration to which the element is to be bent and cooperatively profiled to mate intimately with substantially the entirety of the exterior of said complex cross-sectional configuration of the element along the extent thereof to be bent for maintaining and supporting said complex configuration,
  (b) heating the mated element along at least a portion of the extent thereof to be bent with a heating fluid sufficiently to cause the thermoplastic material to lose a substantial portion but not all of its rigid characteristics,
  (c) continuing heating of the element along the extent thereof to be bent and, in conjunction therewith, moving the dies into intimately mating and cross-sectional configuration supporting engagement with the element over said extent of the element thereby to bend the element to the desired curve, and
  (d) cooling the element over said extent sufficiently to restore rigid characteristics to the material while maintaining the element mated between the dies.

2. A method according to claim 1 wherein the heating fluid is saturated steam.

3. A method according to claim 1 including applying the heating fluid directly to the element.

4. A method according to claim 3 including applying the heating fluid to the element through at least one of the dies.

5. A method according to claim 4 wherein the one die is defined by a thermoconductive material, and the continued heating of the element is accomplished by transfer of stored heat from the thermoconductive material to the element.

6. A method according to claim 4 wherein continued heating of the element includes continuing application of heating fluid directly to the element during movement of the dies into said intimate mating engagement with the element over said extent of the element.

7. A method according to claim 1 wherein the first die is a rigid die and the second die is a flexible die.

8. A method according to claim 1 wherein the thermoplastic material is a vinyl resin.

9. A method according to claim 1 wherein the temperature of the heating fluid is between the deflection temperature of the thermoplastic material at 264 psi and the compression molding temperature of the thermoplastic material.

10. A method according to claim 9 wherein the heating fluid temperature is closer to said deflection temperature than to said compression molding temperature.

11. A method according to claim 1 including heating the element by applying heating fluid directly to the element through passage means formed through at least one of the dies, and cooling the bent and mated element by applying a fluid cooling medium to the element through the passage means.

12. A method according to claim 11 wherein the fluid cooling medium is air.

13. A method according to claim 1 wherein the dies are progressively moved into mating engagement with the element proceeding from one end of said extent to the other end of said extent.

14. A method according to claim 13 wherein the progressive movement of the dies is terminated when the element has been bent to the desired curvature.

15. In the formation of a bend of selected curvature and subtended arc in a selected portion of the extent of an elongate extruded shape of rigid vinyl resin and the like, the shape in cross-section having a relatively thin web and at least one relatively thin flange extending a substantial distance substantially normally therefrom so that the cross-sectional configuration of the element has substantial susceptibility to significant distortion of the geometry thereof during bending, the improvement residing in a method of making the bend in the shape without significant distortion of the complex cross-sectional configuration of the shape, the method comprising, in combination, the steps of
  (a) providing a convex rigid die defining the curvature to which the shape is to be bent and profiled to mate with selected portions of the exterior of said complex cross-sectional configuration of the shape,
  (b) providing a flexible die profiled in cooperation with the rigid die to mate intimately with the remaining portions of the exterior of said complex cross-sectional configuration of the shape for supporting and maintaining said configuration as the shape is bent along said extent thereof,
  (c) intimately mating the shape between the dies at one end of the extent thereof to be bent,
  (d) applying saturated steam to the mated shape through passage means formed through at least the rigid die to heat the shape sufficiently to soften the resin to a plastic state in which the resin retains a portion of its original tensile strength,
  (e) progressively moving the flexible die and the rigid die together proceeding from the one end of said extent while continuing application of the steam until the shape has been moved into intimate mating engagement between both dies over a length thereof defining the selected subtended arc, and
  (f) cooling the shape to restore rigid characteristics to the resin before disengaging the shape from between the dies.

16. A method according to claim 15 including applying saturated steam to the extrusion through the flexible die.

17. A method according to claim 15 wherein the cooling step is performed by applying air to the bent shape through the passage means.

18. A method of bending an elongate "shape" fabricated of substantially rigid synthetic thermoplastic material into an essentially closed loop having at least two spaced rounded bend parts without significant distortion of the cross-sectional configuration of the shape, the method comprising the steps of (a) providing a convex die for each rounded bend part of the loop, each convex die defining the inner radius of curvature of the corresponding rounded bend part and profiled to mate with a portion of the cross-sectional configuration of the shape, (b) providing a flexible die profiled and defined to mate with the remainder of the cross-sectional configuration of the shape before, during and after bending of the shape and having a length greater than the developed length of any rounded bend part, (c) intimately mating the shape between one of the convex dies and the flexible die at one end of the extent thereof to be bent to define a first rounded bend part, (d) heating the mated shape with a heating fluid sufficiently to cause the thermoplastic material to lose a portion but not all of its rigid characteristics, (e) continuing heating of the shape along said extent and, in conjunction therewith, progressively moving the one convex die and the flexible die into intimately mating engagement with the shape over said extent, (f) cooling the shape over said extent sufficiently to restore rigid characteristics to the material while maintaining the shape mated between the dies, and (g) maintaining the shape engaged with the one convex die and repeating steps c), d), e) and f) with the flexible die and successive ones of the other convex dies to define said loop.

19. A method according to claim 18 including maintaining the convex dies stationary during bending of the shape to define all the rounded bend portions of the loop, and moving the convex dies inwardly of the loop upon completion of the bending processes to facilitate removal of the loop from the dies.

20. A method according to claim 18 including maintaining the convex dies stationary during bending of the shape to define all the rounded bend portions of the loop, and severing the shape between the ends of the element for removal of the bent shape from the convex dies.

21. A method according to claim 18 including heating and cooling the shape by applying heating fluid and a fluid cooling medium, respectively, to the shape through common passage means in the respective convex dies.

22. A method according to claim 18 including heating and cooling the shape by applying heating and a fluid cooling medium, respectively, to the shape through the flexible die.

* * * * *